(12) United States Patent
Di Cosola

(10) Patent No.: US 12,393,919 B2
(45) Date of Patent: Aug. 19, 2025

(54) DATA EXCHANGE WITHIN A LAYER ZERO (L_0) HGTP, DAG, WEB3 STATE CHANNEL SMART SELF-HEALING NODE CENTRIC BLOCKCHAIN MESH NETWORK

(71) Applicant: Michele Di Cosola, Bloomingdale, IL (US)

(72) Inventor: Michele Di Cosola, Bloomingdale, IL (US)

( * ) Notice: Subject to any disclaimer, the term of this patent is extended or adjusted under 35 U.S.C. 154(b) by 518 days.

(21) Appl. No.: 17/855,769

(22) Filed: Jun. 30, 2022

(65) Prior Publication Data

US 2022/0343768 A1  Oct. 27, 2022

Related U.S. Application Data

(63) Continuation-in-part of application No. 17/683,339, filed on Feb. 28, 2022, and a continuation-in-part of
(Continued)

(51) Int. Cl.
*G06F 16/00* (2019.01)
*G06F 16/27* (2019.01)
(Continued)

(52) U.S. Cl.
CPC ............ *G06Q 20/20* (2013.01); *G06F 16/27* (2019.01); *G06Q 10/0832* (2013.01); *G06F 16/2379* (2019.01)

(58) Field of Classification Search
CPC .................................................. G06F 16/2379
See application file for complete search history.

(56) References Cited

U.S. PATENT DOCUMENTS 8,439,301 B1  5/2013  Lussier et al.
8,899,903 B1  12/2014  Saad et al.
(Continued)

FOREIGN PATENT DOCUMENTS

KR       102080226       2/2020

*Primary Examiner* — Noosha Arjomandi

(57) ABSTRACT

A system for providing a smart, self-healing blockchain-based data exchange data storage device within a self-healing node centric blockchain mesh network, a smart self-healing data exchange device being within one or more universal computing nodes within a self-healing node centric blockchain mesh network is disclosed. The smart self-healing data exchange device being contained within one or more universal computing nodes within a self-healing node-centric blockchain mesh network. The smart self-healing blockchain data exchange device includes a blockchain processor for storing and maintaining a set of blockchain data records stored within a blockchain ledger, each blockchain data record within the set of blockchain data records having a blockchain ID, a universal computing node ID, a bundle of digital access rights, and content data, and an instantiation of the blockchain ledger communicatively coupled to the blockchain processor is stored within a plurality of the one or more universal computing nodes within a self-healing node centric blockchain mesh network. The bundle of digital access rights provides for rights and privileges associated with blockchain data records that can be divided by use, terms, and ownership.

5 Claims, 7 Drawing Sheets

Related U.S. Application Data application No. 17/187,871, filed on Feb. 28, 2021, and a continuation of application No. 16/866,484, filed on May 4, 2020.

(60) Provisional application No. 63/217,217, filed on Jun. 30, 2021, provisional application No. 63/217,206, filed on Jun. 30, 2021, provisional application No. 63/154,746, filed on Feb. 28, 2021, provisional application No. 62/983,486, filed on Feb. 28, 2020, provisional application No. 62/842,757, filed on May 3, 2019.

(51) Int. Cl.
   *G06Q 10/0832* (2023.01)
   *G06Q 20/20* (2012.01)
   *G06F 16/23* (2019.01)

(56) References Cited

U.S. PATENT DOCUMENTS

| | | |
|---|---|---|
| 9,481,458 B2 | 11/2016 | Magana et al. |
| 9,551,989 B2 | 1/2017 | Scaratti et al. |
| 9,984,389 B2 | 5/2018 | Nozawa |
| 10,032,125 B1 | 7/2018 | Berg et al. |
| 10,169,735 B2 | 1/2019 | Lund et al. |
| 10,240,846 B2 | 3/2019 | Winkle et al. |
| 10,435,156 B2 | 10/2019 | Bellof et al. |
| 10,457,421 B2 | 10/2019 | O'Toole |
| 10,526,088 B2 | 1/2020 | Bonazzoli |
| 10,592,843 B2 | 3/2020 | Natarajan et al. |
| 10,748,107 B2 | 8/2020 | Stoman |
| 10,863,330 B1* | 12/2020 | Lingle ............... H04W 4/027 |
| 11,075,891 B1 | 7/2021 | Long |
| 11,310,719 B1* | 4/2022 | Boschulte ........ H04W 40/248 |
| 2012/0210853 A1 | 8/2012 | Abershitz et al. |
| 2017/0073085 A1 | 3/2017 | Tremblay et al. |
| 2018/0049575 A1 | 2/2018 | Yamrick |
| 2018/0090040 A1 | 3/2018 | Randall et al. |
| 2018/0305018 A1 | 10/2018 | Tian et al. |
| 2019/0044818 A1* | 2/2019 | Nolan ................. H04W 8/005 |
| 2019/0108472 A1 | 4/2019 | Sweeney et al. |
| 2019/0123580 A1* | 4/2019 | Bindea ............... G05B 13/026 |
| 2019/0258910 A1 | 8/2019 | Stoman |
| 2019/0263521 A1 | 8/2019 | O'Brien et al. |
| 2019/0340569 A1 | 11/2019 | Prager et al. |
| 2020/0079530 A1 | 3/2020 | Walsh et al. |
| 2020/0133271 A1 | 4/2020 | Grundey et al. |
| 2020/0167722 A1 | 5/2020 | Goldberg |
| 2020/0207474 A1 | 7/2020 | Foggia et al. |
| 2020/0242548 A1 | 7/2020 | Curry et al. |
| 2020/0255163 A1 | 8/2020 | Janssen |
| 2020/0374106 A1* | 11/2020 | Padmanabhan ..... H04L 63/0428 |
| 2021/0258380 A1* | 8/2021 | Sunshine ............. H04L 67/02 |
| 2022/0198562 A1* | 6/2022 | Cella .................. G06Q 40/04 |
| 2022/0274703 A1* | 9/2022 | Di Cosola ............. G07C 3/14 |
| 2022/0286845 A1* | 9/2022 | Vanoss ................ H04W 4/80 |
| 2022/0343768 A1* | 10/2022 | Di Cosola ........... G06Q 20/0655 |
| 2022/0343776 A1* | 10/2022 | Di Cosola ............. G08G 5/76 |
| 2023/0095505 A1* | 3/2023 | Dicosola ............. G09F 21/08 |
| | | 701/3 |
| 2024/0130002 A1* | 4/2024 | Khanna ............. H04W 74/006 |
| 2024/0247967 A1* | 7/2024 | Klicpera ............. G01F 25/10 |
| 2024/0249628 A1* | 7/2024 | DiCosola ............. H04L 67/55 |

* cited by examiner

DATA EXCHANGE WITHIN A LAYER ZERO (L_0) HGTP, DAG, WEB3 STATE CHANNEL SMART SELF-HEALING NODE CENTRIC BLOCKCHAIN MESH NETWORK

CROSS-REFERENCE TO RELATED APPLICATION

This application claims priority to the U.S. Patent Application No. 63/217,206, titled "A Universal Computing Node in a Distributed Computing Environment," and filed on Jun. 30, 2021, and U.S. Patent Application No. 63/217,217, titled "Low-Latency Blockchain Weather Data Exchange," and filed on Jun. 30, 2021. This application claims priority to U.S. patent application Ser. No. 17/683,339, titled "Autonomous Inspection System Within A Smart Self-Healing Node Centric Blockchain Network For Safety And Quality Management," and filed on Feb. 28, 2022, which itself also claims priority to U.S. Patent Application No. 63/154,746, titled "Artificial Intelligence Machine Learning AIML SMS SRM CRM QMS and Blockchain Cyber Security System for Unmanned Aircraft Vehicles UAV Systems," filed on Feb. 28, 2021.

This application is also claims priority to related, commonly owned, and U.S. Patent Application Ser. No. 16/866,484, titled "Smart Drone Rooftop and Ground Airport System," and filed on May 4, 2020, that itself claims priority to U.S. Provisional Patent Application No. 62/842,757, filed May 3, 2019, titled "Universal Automated Artificial Intelligence Rooftop UAS/UAV Drone Port/Airport Station For General Purpose Services Of Robotic UAS/UAVS, And Its Supporting Hardware & Equipment Related To: Loading/Unloading Deliveries, Deployment/Arrival, Dispatching, Air Traffic Control, Charging, Storing/Garaging, De-Icing/Anti-Icing, Meteorological & Data Dissemination/Retrieval, Big Data Mining And Mimo Network Services," and U.S. Provisional patent application Ser. No. 17/187,871, titled "Smart City Smart Drone UAS/UAV//VTOL Mailbox Landing Pad," filed on Feb. 28, 2021, that claims priority to U.S. Provisional Patent Application No. 62/983,486, titled "Smart City Smart Drone UAS/UAV//VTOL Mailbox Landing Pad," filed Feb. 28, 2020.

This application is related to U.S. Provisional Patent Application, Ser. No. 63/322,579, titled "Smart Delivery Doorbell and Chime Data Blockchain Miner with Crypto and Token Integration and Smart Drone Landing Pad Data Miner," filed Mar. 22, 2022.

This application is also related to concurrently filed and commonly assigned U.S. Patent Application Ser. No. 63/217,206, titled "A Universal Computing Node in a Distributed Computing Environment," filed 30 Jun. 2022. All of the above-referenced applications are incorporated herein as if recited in their entirety.

TECHNICAL FIELD

This universal and smart web3, horizontal and dynamic HGTP, DAG and State Channel server platform and full stack application that relates in general to a cloud, edge, and on premises repository and non-repository system for providing a data exchange and sub-exchanges using interoperable hardware and agnostic software node integration, scalability, immutability, dynamic blockchain data validation on a Proof of Reputation (PRO) Hyper Transfer Protocol (HGTP) using a node data aggregation and consensus, data railing and distribution, and data market maker services, via data buyer and seller dashboards, data searching and query, data purchasing and digital data bundle of rights integration, to allow for a real time dynamic and fluid data rights negotiations between data sellers and data acquisition management using smart contracts and or state channels that support aggregated legacy, Web2, cross-chain networks, data, liquidity and crypto, for agnostic data acceptance on a Layer Zero, Layer 1 and or Layer 2 decentralized Network and or node with an inverted polarity aggregation network architecture shared on a Layer Zero, Layer 1 and or Layer 2 decentralized network for shared fractalization of data, hardware, cyber space inflation, memory, memory speed and full spectrum communication hopping, using a Non-Fungible crypto and or token source or derivative such as a Non-Fungible Token (NFT), with or without a Non-Fungible Rights (NFR) Crypto or Token/Non-Fungible Rights Layer Zero (NFRL0) Crypto or Token and or series such as NFT2.0, for crypto bandwidth, mobile applications, users, operators, validators, miners and network data bandwidth crypto social rewards, data acquisition, and more specifically, to a system for providing a Web2, Mainnet 1.0, Mainnet 2.0, Web3, hypergraph transfer protocol (HGTP), directed acyclic graph (DAG), integration of nodes, resilient validated Proof of Reputation or (PRO) data, with both sub-networks and state channels, on a distributed network Layer Zero(0), Layer 1 and Layer 2 Networks and URL domain names that are horizontally scalable on a data agnostic, cross-platform, cross-chain, cross-crypto, blockchain-based data and crypto/token exchange providing point-to-point (P2P), point-to-cloud (P2C), cloud-to point (C2P), point-to-premises (P2Prem), data storage repository and data directed device(s) within a self-healing node centric blockchain mesh network with or without a digital twin for predictive data analytics and lifecycles for the autonomous and IoT edge infrastructure solutions with spectrum agnostic communication hopping, devices, device mining, nodes, security crypto, utility tokens, digital wallets, metaverse, 3D and 4D omniverse, integration. Allowing for Data Rating Services, Data Backed Securities that can be created and used for an exchange market using agnostic NFTs, NFRs, and its derivatives, agnostic raw and fusion data, agnostic spectrum frequency hopping, traditional network cloud network architecture and inverted, polarized and fractalized networks, reverse data aggregation, dynamic time allocations, dynamic, interoperable and agnostic interconnected device locations, cyberspace and cyberspace inflation monetization, by creating a edgeless and seamless autonomous infrastructure nexus between physical assets such as building structure like Smart Rooftop and Ground Airport/Vertiports/Drone Ports for the autonomous delivery of people and cargo, and on and or off premises cloud/dark kitchens and agnostic digital data assets from sensors and miners on a Smart Self-Healing Node Centric Blockchain Mesh Network, which takes blockchain validated data and artificial intelligence and real time machine learning algorithm integration which provides for data that is discoverable, immutable, resilient, adaptable, transparent, scalable, low latency, repurposing of data that is monetizable on a HGTP Horizontal Web3 Layer Zero directed acyclic graph (DAG) using units of measure, cross-chain and crypto liquidity with data exchange and sub-exchange repositories, distributed ledgering, and cyber security integration and clearances.

BACKGROUND

Distributed processing systems in which applications are performed as smaller operating procedures across a number of processing systems over a geographic area have been growing in functions, complexity, and uses as individual processing systems increase capabilities when, at the same time, communications networks allow large amounts of data to be transmitted between these processing systems. This trend has given rise to a number of processing approaches including edge computing, mesh computing, Internet of Things (IoT), and autonomous vehicles operating in a distributed controlled environment.

An evolution is occurring for autonomous and manual transportation for cargo and people via the next-generation delivery infrastructure. The autonomous delivery infrastructure, soon to come, needs a commercially viable and sustainable solution to be successful. Simply relying on revenue from the delivery of people or cargo is not enough. Delivery service providers need to be able to have the public's buy-in to support the solution of autonomous drone and virtual take-off and landing (VTOL) delivery and therefore need to rely on the data that could make it happen. However, data to support beyond visual line of sight (BVLOS) delivery was not trusted, was not cyber protected, did not have a genesis creator of data with its chain of custody as to its original source, and was easily spoofed. If someone wanted to sell their data after personal use, it was not discoverable by others, and even if it was, it was not reliable, trusted data that can be repurposed and/or used in near real-time for other operations after it has been validated as good data. More importantly, the infrastructure to make a bunch of smart drone airports from the ground up to support a true last-mile logistics is too cost-prohibitive and would take years to develop.

Currently being developed is a wide spectrum of how the autonomous infrastructure operates and matures into a commercially viable and sustainable model while integrating into existing manual transportation fleet operations and building infrastructures. This infrastructure is evolving into a system that, in addition to the operation of the UAV devices, includes a decentralized data exchange market maker of blockchain validated data as a service (BVDaaS), blockchain validated data storage as a service (BVDSaaS), and data market maker as a service (DMMaaS) for the autonomous infrastructure and beyond.

This infrastructure needs to be able to help metadata asset and property owners as the first-ever blockchain decentralized ledger, decentralized discoverable repository data exchange, and market maker of immutable data for data suppliers and users of autonomous cargo and people transportation and digital twin infrastructure.

Therefore, a need exists for a system for providing a smart, blockchain-based data exchange data storage device within a self-healing node-centric blockchain mesh network. The present invention attempts to address the limitations and deficiencies in prior solutions according to the principles and example embodiments disclosed herein.

SUMMARY

In accordance with the present invention, the above and other problems are solved by providing a system for providing a smart, blockchain-based data exchange data storage device within a horizontal hypergraph transfer protocol (HGTP), directed acyclic graph (DAG), smart self-healing node centric blockchain mesh layer zero state channel, proof of reputation (PRO) consensus decentralized aggregated and inverted aggregated edgeless network of nodes, data mining and agnostic spectrum frequencies, according to the principles and example embodiments disclosed herein.

In one embodiment, the present invention is a system for providing a smart, self-healing blockchain-based data exchange data storage device within a self-healing node-centric blockchain mesh network, a smart self-healing data exchange device being within one or more universal computing nodes within a self-healing node centric blockchain mesh network is disclosed. The smart self-healing data exchange device being contained within one or more universal computing nodes within a self-healing node-centric blockchain mesh network. The smart self-healing blockchain data exchange device includes a blockchain processor for storing and maintaining a set of blockchain data records stored within a blockchain ledger, each blockchain data record within the set of blockchain data records having a blockchain ID, a universal computing node ID, a bundle of digital access rights, and content data, and an instantiation of the blockchain ledger communicatively coupled to the blockchain processor is stored within a plurality of the one or more universal computing nodes within a self-healing node centric blockchain mesh network.

In another aspect of the present invention, the bundle of digital access rights provides for dynamic rights and privileges negotiated in real-time and associated with blockchain data records that can be divided by use, terms, and ownership into Non-Fungible Token, (NFT), Non-Fungible Right (NFR) under layer zero, layer one and or layer 2 networks.

In another aspect of the present invention, the digital data bundle of rights and digital access rights via non-fungible rights (NFRs) comprises an agreed-to ownership title and or use under agreed-to terms and conditions to contents of a blockchain data record, a right to resell the contents of a blockchain data record, a right to copy the contents of a blockchain data record, a right to access the contents of a blockchain data record being limited in time, a right to access the contents of a blockchain data record being limited in use, and a right to access to contents of a blockchain data record being limited in data format. Existing real estate has a bundle of rights, however, the digital asset sector does not have a bundle of rights, and is in need of a digital data bundle of rights, using a back-office dashboard for both the data creator and the data acquisition user, that is dynamic, scalable, and agnostic in nature for the terms and conditions agreed to that would be turned into a Layer zero NFR tokens and or smart contract under state channel for all state channels and sub-chains providing for validated trusted data.

In another aspect of the present invention, the bundle of digital access rights further restricts the access and use to the contents of a blockchain data record using any other characteristic associated with the contents of the blockchain data record.

In another aspect of the present invention, the blockchain processor and a blockchain ledger utilize a communications and secure storage technologies including L_0 (level zero) distributed network, HGTP (hypergraph transfer protocol) network, and any, inverted polarity architecture network, P2P and or TCP-IP network configuration and protocol.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
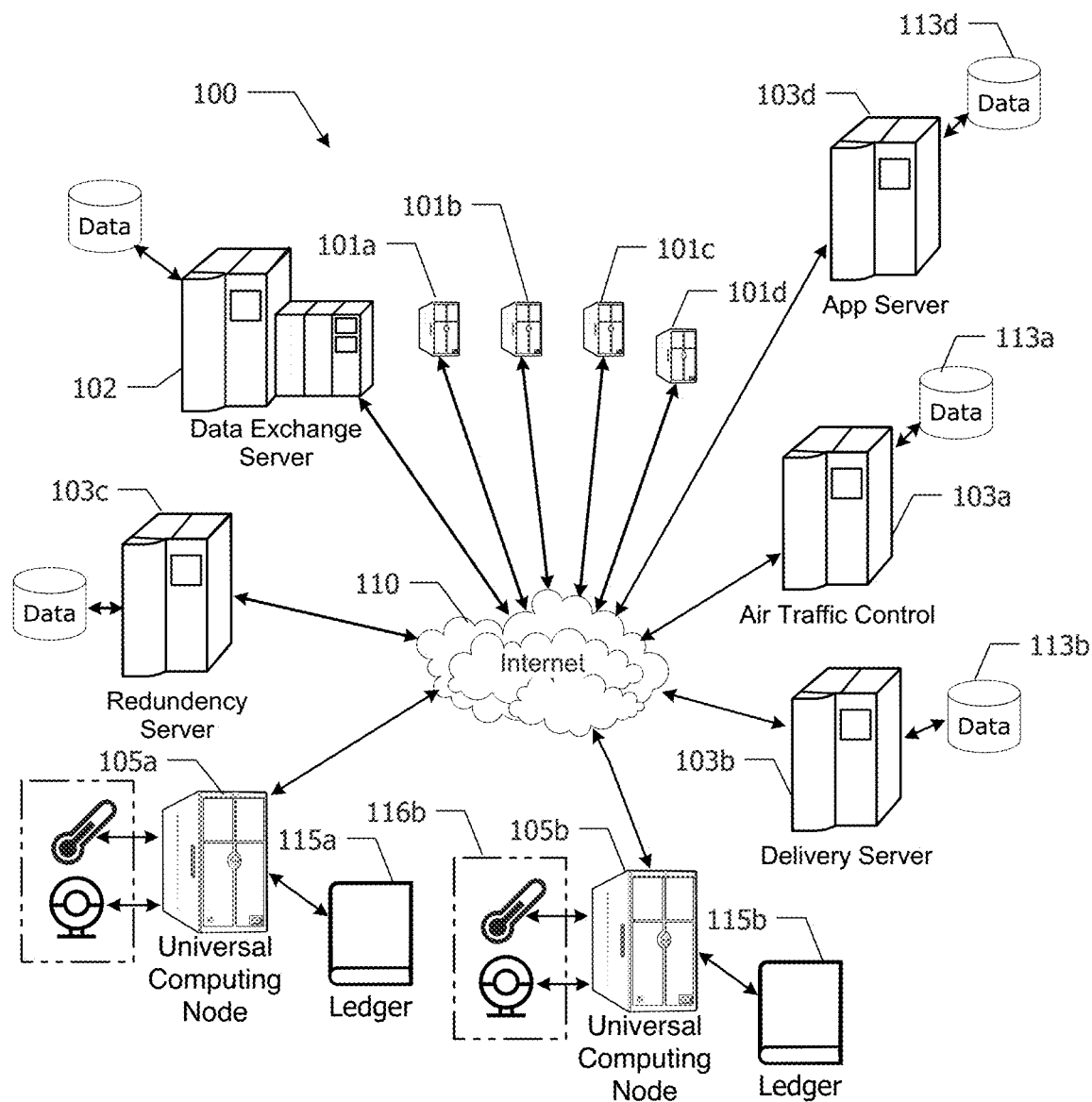
FIG. 1 illustrates an example embodiment of a system for providing smart, blockchain-based data exchange data storage devices within a self-healing node-centric blockchain mesh network according to the present invention.

This application relates in general to a system for providing data searching, data offerings, data purchasing and rights management, and data acquisition, and more specifically, to a system for providing smart, blockchain-based data exchange data storage device within a self-healing node-centric blockchain mesh network according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context dictates otherwise. As used herein, a plurality of items, structural elements, compositional elements, and/or materials may be presented in a common list for convenience. However, these lists should be construed as though each member of the list is individually identified as a separate and unique member. Thus, no individual member of such a list should be construed as a de facto equivalent of any other member of the same list solely based on their presentation in a common group without indications to the contrary. As used herein, the singular forms "a," "an," and "the" are intended to include the plural forms as well, unless the context indicates otherwise.

It further will be understood that the terms "comprises," "comprising," "includes," and "including" specify the presence of stated features, steps, or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

The terms "individual" and "user" refer to an entity, e.g., a human, using a system and method for providing data searching, data purchasing and rights management, and data acquisition, and more specifically, a system and method for providing a distributed secure data exchange computing environment used to support autonomous devices having blockchain processing associated with the invention. The term user herein refers to one or more users.

The term "invention" or "present invention" refers to the invention being applied via the patent application with the title "Data Exchange within a Layer Zero (L_0) HGTP, DAG, Web3 State Channel Smart Self-Healing Node Centric Blockchain Mesh Network." The invention may be used interchangeably with data exchange.

The term "mobile application" refers to an application executing on a mobile device such as a media player, set-top box, smartphone, tablet, smart-watch, smart-tv, smart monitor, "doorbell", "smart delivery doorbell and chime miner", smart drone landing pad miner" and/or web browser on any computing device.

The term "application programming interface" that is also referred to as "API" refers to a computer programming construct permitting a computing process running on a particular computing device to access software and related operations provided by a third-party running on a separate computing device using a standardized interface and data exchange format. The use of APIs to access third-party software permits the development of collaborative computing products in which software components from different sources operate together to implement a processing solution.

The term "SDK" or "Software Development Kit" refers to a set of tools and instructions developers use to build applications.

The term "firmware" refers to embedded software within a hardware device that provides functionality associated with the operation of the hardware device. Firmware may be distinguished from application programs and similar software as the applications typically are executed on general-purpose computing devices and user-operated devices.

The term "unmanned aerial vehicles (UAV)" refers to an embodiment of a UAV. These UAVs may include, but are not limited to vertical take-off and landing vehicles (VTOL), electronic vertical take-off and landing vehicles (eVTOL), unmanned ground vehicle (UGV), unmanned aerial systems (UAS), vertical short take-off and landing vehicles (VSTOL), short take-off and landing vehicles (STOL), electric small take-off and landing vehicles (eSTOL), conventional take-off and landing vehicles (CTOL), electric conventional take-off and landing vehicles (eCTOL), autonomous vehicles (AVs), connected and autonomous vehicles, cargo air vehicles (CAV), electric cargo air vehicles (eCAVs), passenger air vehicles (PAVs), hydrogen unmanned vehicles (HUV), hydrogen and electric unmanned vehicle hybrids (HEUVH), and electric passenger air vehicles (ePAVs).

The term "Autonomous Transportation System of Systems," includes unmanned traffic management. (UTM) fleet operations, drone/UAV devices, unmanned ground vehicles (UGV), unmanned marine vehicles (UMV) devices, unmanned ground delivery robots (UDR) devices, and or vertical and take-off vehicles (VTOLs)/UAV devices.

The term "UTM fleet operations" refers to UTM fleet operations for stakeholders who manage their own fleets of autonomous vehicles, and will be able to protect their data by being onboarded and integrated into the UAV network. Existing UTMs provide data that cannot be reused with trust by another interested third party. There is no way to let third parties know what data is currently available that can be repurposed for use from one or more of the data exchange(s) disclosed herein. The present invention provides an interoperable open software platform in which UTMs can capture the value of this data both for their company and their clients on a smart self-healing node-centric mesh network using Proof of Reputation (PRO) to validate the data as trusted data on the network from the genesis creation at the edge, on a Layer zero (L_0) hypergraph transfer protocol (HGTP) Layer Zero (L_0) network, Layer zero (L_0) state channels, smart contracts, directed acyclic graph (DAG), with the option to work between Web2, Web3, Mainnet 1.0 and Mainnet 2.0. The HGTP network is agnostic in the sense that it can allow for cross-chain (blockchain) with layer zero (L_0), layer one (L1), and or Layer (L2) networks to interact with the network. It is data agnostic, scalable, modular, and hardware interoperable. This allows for cross-chain liquidity and crypto and or token use. This validated trusted data will be able to then be able to go to our Data Exchange where it can be offered with terms and conditions from data creator/suppliers to data acquisition users who will each use a back-office dashboard where they will be able to negotiate the digital data bundle of rights (DDBR) terms and conditions between the data they queried. Once agreed to, layer zero (L_0) non-fungible right (NFR) is created that locks in the key and agreement to the terms and conditions of the trusted data that will be able to allow for the access to the data. A market maker fee will then be charged for the transaction of the aggregated and railed validated and trusted data that was discoverable on the repository and or depository network via query and negotiated and secured by an NFR.

The term "drone/UAV providers" refers to robot and manual vehicle manufacturers with sensors such as light detection and ranging (LiDAR), radar, telemetry sensors, and weather sensor payloads that provide situational awareness, detect and avoid, collision avoidance, terrain avoidance, object avoidance, deconfliction, digital twin predictive analytics for data such as lifecycles, failures, traffic control, and maintenance, either because there is a governing body mandate and/or for an added feature for an additional data solution. Very few existing autonomous delivery transportation stakeholders can sustain the cost of R&D, manufacturing, maintenance, and high delivery costs, without continual large cash infusions, which makes the existing models not commercially viable and sustainable without a method by which to offset those costs.

The term "data exchange" refers to a validated and aggregated decentralized data storage device that stores data received for long-term usage onto an HGTP, DAG, Web3, L_0, L1, and or L2, blockchain ledger using blockchain processing, state channel(s), PRO Consensus and cross-chain data, smart contracts, NFTs, NFRs, fiat, networks, and or liquidity. The data ledger is maintained on a plurality of universal computing nodes as is common in all blockchain processors. These computing nodes are disclosed herein as being interconnected over a distributed computing network using standard data communications protocols that self-police each other using a Proof of Reputation (PRO) cluster and consensus between nodes for confirmation that the data is trusted data and therefore validated data. If not trusted, this data is contained for future forensic examination and does not go pollinate the blockchain network after containment. One skilled in the art will recognize that the blockchain ledgers being maintained by multiple universal computing nodes also may be implemented with other comparable communications and secure storage technologies including L_0 (level zero) distributed network, HGTP (hypergraph transfer protocol) network, and any other network configuration and protocol. Data is aggregated from the edge device/hardware by point-to-point (P2P), point-to-cloud (P2C), and or point-to-premises and can be railed out for specific real-time on-demand use while having the capability to be aggregated and stored into the depository and or repository where it can become discoverable, validated and trusted data under our market maker platform which allows for fiat, crypto, token and or non-fungible tokens and or non-fungible rights to be used as a feel for the transaction between a data creator/distributor and a data acquisition/user using agnostic data, blockchain networks, digital wallets, crypto, tokens, and fiat solutions.

The term "L_0 distributed network" refers to existing layer zero, decentralized HGTP network, DAG, Web3, state channels, data validation by node consensus, cryptocurrency token standards, and protocols with zero to very low gas fees, vary low latency, scalability and decentralized layer 1 protocols such as Ethereum (ETH) and DisCas Vision (DISC) which have high slow latency and vastly fluctuating and high gas fees (transaction fees) to use their networks. The historic data cannot be created at its original source because the data validators in ETH are not providing the full historic blockchain data creation events, when using Proof of Work (PoW) and Proof of Stake (PoS) metrics, which contributes to the high gas fees and latency associated with the various networks. Using this older method of layer 1 protocols vs the new method of layer zero protocols on HGTP, the business models' cost and profit predictability, scalability, and sustainability become uncertain for DISC and ETH to produce commercially sustainable and viable blockchain validated and trusted data such as that provided by using our smart self-healing node centric mesh network, Autonomous Data Infrastructure, Proof of Reputation (PRO) and the AMX/Sub-Exchange Data Exchange on a decentralized market maker platform. Layer zero (L_0) provides for near-zero gas fees associated with the Web3, state channel, horizontal hypergraph transfer protocol (HGTP), and directed acyclic graph (DAG) network with proof of reputation (PRO) consensus of validated data, to solve this problem.

The term "data redefined" refers to creating a commercially viable and sustainable autonomous infrastructure. The present invention introduces a disruptive method by which to evolve the existing manual aviation and vehicle aviation structure and economics into a redefined data structure that will take existing cost-affordable sensors and integrate them into an autonomous system that can be sustained through the use, subsidization, and monetization of trusted data via Proof of Reputation (PRO), with solutions such as aggregation, railing, and digital twin predictive analytics, crypto and or token social and or loyalty rewards. The present invention has created a solution for repurposing roofs, land, mailboxes, doorbells, landing pads, charging stations, hangers, containers, automated drone battery swapping, charging, drones, data miners, data, networks, and trusted data exchanges for the autonomous infrastructure. This architecture must include at a minimum, but not be limited to, a system that is data, network, fiat, non-fungible, digital wallet, token and or crypto agnostic, data repurposed, Data Depository and Repository, Rooftop and Ground Space Repurposed, Smart Rooftop and Ground DronePort, Vertiport, Airport, Smart Mailbox Landing Pads, and Smart Parcel Mailboxes Landing Pad Miners Repurposed as Smart Mailbox Landing Pads™, Smart Delivery Doorbell, and Chime Miners, Smart Drone Landing Pad Miners, Smart Own the Air Around You with Metadata, Digital Data Bundle of Rights, Non-Fungible Rights (NFRs), Smart Automated Charging Stations and Drone Battery Swapping Miners, Smart Drone, and Delivery Container Miners, Discoverable Data with Integrity, Live Data Repurposed, Historic Data Repurposed, Existing Infrastructure Repurposed, digital twins, metaverse, omniverse and non-fungible tokens (NFTs).

The term "data agnostic" refers to allowing for all types of industry-accepted data formats to be universally accepted in the node network. The smart self-healing node-centric blockchain mesh decentralized network offers a delivery drone app and data exchange that is hardware/software, network, and data-agnostic on an interoperable, scalable, and open platform. This delivery drone app provides social and or loyalty crypto rewards for opt-in and agnostic metadata shared for monetization and subsidization.

The term "data repurposed (repurposed data)" refers to taking existing blockchain resilient and proof of reputation (PRO) node consensus validated trusted data that has been used for its purpose and/or stored for memorialization and repurposing it to be sold on a discoverable decentralized HGTP, DAG, Web3, data exchange for subsidization and/or monetization of hard and soft costs.

The term "Data Depository and Repository" refers to assigning data to be used for something other than its original purpose by uploading the data into a data storage depository or repository for future subsidization and or monetization. Repurposed data means recurring and residual income opportunities.

The term "Rooftop and Ground Space Repurposed" refers to residential, commercial, and industrial rooftops and parking spaces that can be repurposed as a part of the autonomous infrastructure. By repurposing existing and previously worthless rooftop and ground space, the smart decentralized self-healing node-centric blockchain hypergraph network creates a multi-modal autonomous infrastructure consisting of nodes (machines, sensors, drones, landing pads, charging stations, VTOLs, UGVs, robots, etc.) necessary to create True Last Mile Logistics and fill the data gaps that government and existing airport waypoints cannot fulfill. Using existing rooftops and ground infrastructure, the system can create raw and or daisy-chained fusion weather data points, delivery waypoints and smart drone, VTOL and UGV True Last Mile Logistics drone ports/vertiports/smart airports by using existing unused and once worthless real estate.

The term "Mailboxes and Parcel Mailboxes Repurposed" as Smart Mailbox Landing Pads™" refers to_repurposing existing federal-regulated mailboxes to integrate a Smart Mailbox Landing Pad™ into an existing shipping logistics infrastructure that can provide point-to-point blockchain validated AIML edge computing, point to point (P2P), point to premises, and point-to-cloud communications. Smart Mailbox Landing Pads™ creates delivery waypoints for customers. These Smart Mailbox Landing Pads can be data miners such as Smart Mailbox Landing Pad Miners and or repurposed Smart Drone Landing Pad Miners. The decentralized HGTP, DAG, Web3, and smart self-healing node-centric mesh network can close the loop of a full turn-key utility autonomous drone, vehicle, and robot delivery process. This will also allow for existing manual operators to benefit from avoiding the grounding of their planned flight operations by taking existing node data from the departure waypoint, en route waypoint, and arrival waypoint of the landing pad, and figure out how to avoid any adverse weather being reported on existing sensors to maintain operations without grounding the vehicles. This is real lost opportunity savings. Situational awareness and Beyond Visual Line of Sight (BVLOS) Operations can utilize the sensors for weather data, as well as object and terrain detection and avoidance, artificial intelligence, machine learning, and or near real-time, real-time, and even faster than real-time autonomous decision making.

The term "Own the Air Around You with Metadata" refers to users controlling the metadata produced and offering it with rewards by participating in gamification programs. Governing bodies and participating data creators, distributes and acquisition users can audit, use, monetize and have rules that can integrate with this solution. Class A, B, C, D, E, and G airspace for example can be over a user's private property airspace where their mobile app, mining device, metadata participation, and or edge cloud device that they may own such as their smartphone, smart delivery doorbell miner, smart delivery landing pad miner, that is a node on the network with full agnostic frequency spectrum hopping, inverted aggregation edge cloud network devices, with time, processing, and cyberspace inflation with fractalization, can be recognized as an authorization for crypto rewards to have clearance to fly over private property airspace.

The term "Digital Data Bundle of Rights" refers to_a_digital data bundle of rights that provide for rights and or privileges that can be divided by use, terms, conditions, and or ownership, among other privileges and rights. A bundle of digital access rights comprises a specific dynamic negotiated rights, terms, conditions, and or ownership title to contents of a blockchain data record, a right to resell the contents of a blockchain data record, a right to copy the contents of a blockchain data record, a right to access the contents of a blockchain data record being limited in time, a right to access the contents of a blockchain data record being limited in use, and a right to access to contents of a blockchain data record being limited in data format. The bundle of digital access rights may also restrict the access and use of the contents of a blockchain data record using any other characteristic associated with the contents of the blockchain data record. These agreed-to terms and conditions are finalized into a decentralized HGTP, DAG, Web3 Layer Zero NFR (Non-Fungible Right) smart contract, and or state channel agreement with private access after the payment method chosen is secured via merchant and digital wallet use. The platform allows for data aggregation and rails/railing of data from the depository and or repository as well as the inverse data aggregation and rails/railing from point to point, point to the cloud, point to premises as a Reseller, OEM, and or white label service, and or direct service application.

The present invention provides for a back-office dashboard for both the data creator/supplier and data acquisition/user, where a data supplier can provide data that are assigned specific terms and or conditions that will allow for a data acquisition user to agree to transact. For example, a data supplier may upload an NFT and state that a 72 DPI image can be purchased outright for a certain price, but a 300 DPI is only available by lease for a limited time. That same file can provide the option to buy the data as HD quality, but only if it is used for a digital twin project that will provide for royalty licensing rights. The file also can provide for fractional ownership of the NFT if it is 1200 DPI. The data supplier could even reserve anything that is 600 DPI for a charitable donation and still use the same 600 DPI as only available as a touch point licensing on IoT—only hardware. Determining the Digital Data Bundle of Rights for terms and conditions of the digital data use and or ownership will be limited to the imagination and capability of the data. The dashboard will be scalable as the terms evolve. The type of data and or use of data is agnostic and interoperable. Any data is monetizable or can be provided for free: dynamic and or static data, data types, files, formats, video, audio, communication frequencies, spectrums, etc. In another example, the two dashboards of the data creator/supplier and the data acquisition/user can have real-time and dynamic negotiations. The data acquisition/user can solicit and or create real-time bounty and or hot list requirements, while the data creator/acquisition/user can provide the terms and conditions of the request. that will be able to have a result of taking the agreed-to terms and conditions between participating parties and finalizing it into a merged NFR (Non-Fungible Right) smart contract and or state channel agreement with private and or public access keys, after the method and terms of payment has been realized.

The term "Discoverable Data with Integrity" refers to blockchain validated data that may be trusted as reliable, immutable, resilient data because the data's original created genesis location and owner can be traced to its original data supplier and throughout the sales and use process through the decentralized HGTP state channel blockchain network and data exchange. This Discoverable Data with Integrity allows for the purposing and repurposing of trusted data as a service and can incorporate a trusted data rating service certification, as well as be marketable and monetizable as data-backed security (DBS) should payment with terms are negotiated and or digital data assets are used as collateral.

The term "Live Data Repurposed" refers to the use of live data that has no purpose to be saved and can be bifurcated in real-time while data is live and operational for its existing purpose by blockchain stream into the HGTP data exchange to be repurposed on the data exchange for subsidization and monetization.

The term "Historic Data Repurposed" refers to using historic data that has no purpose other than to be stored for future review and to be saved if and until then, to be repurposed on the data exchange and or one or more of its sub-exchanges for subsidization and monetization.

The term "Existing Infrastructure Repurposed" refers to using existing residential, commercial, and or industrial building structures and their unused surroundings, postal delivery, and transportation infrastructures to be used for the newly created autonomous infrastructure with or without a digital twin thereof, to be ecofriendly.

The term "Digital Twins" refers to the digital twin model of user's sensors, data, building, and or surrounding land and utilities that will offer it to subsidize and or monetize that value of it via the Autonomous Mobility Data (AMX) Exchange and or its sub-exchanges as markets start to understand the value of this digital data, with options of predictive analytics, lifecycles and failure mitigations (i.e. self-healing sensors with spare sensors that receive data after a sensor has hit the governor's allowed threshold of failure tolerance, it will transfer the data to a spare sensor before full failure whereby the spare sensor will be smart in the sense that it will receive the data and know it must and does take over the duties and burden of the failing sensor.)

The term "metaverse" and "omniverse" refers to an artificial digital environment that will provide for entire cities, small size-towns, countries, and worlds using VR, MR, and or AR, NFTs, NFRs, and validated data on a decentralized system. This can be sold on the AMX data exchange(s).

The term "non-fungible tokens" (NFTs) and non-fungible rights (NFRs) refers to digital instruments that will allow for data suppliers and data creators to take their data that would normally be tossed away after an inspection, surveillance, or delivery, for example, and either direct stream the data into the exchange database depository or repository and "purpose" the raw validated data and or "repurpose" the raw and or modeled verified data, to be used within the data exchange(s). As data producers and suppliers start to develop photo images, videos, and or models, such as digital twin cities, that they wish to sell, lease, and or license, but have decided to declare them as an original, unique, and one-of-a-kind digital data work product, that they will not reproduce, they will be able to do so via the NFT and or NFR portion of the exchange.

The term "NFT Bundle of Rights (NFTBOR)" refers to taking a piece of data that can be created into an NFT and or NFR bundle for various uses under custom terms and conditions between the data creator/distributor and the data acquisition/user. For example, users may want to keep the use of the land but sell the mineral rights. Users may want to lease the land itself. Users may also want to sell airspace. These are part of your bundle of rights. It should be no different than you have raw data, an NFT and or NFR digital asset that you want to decide how you break down the use of those rights within its bundle. If a user has declared an original digital data as something the user will not reproduce and want it to be sold as an NFT, that data is the user's property to do with it as he or she would any piece of real estate. However, old NFTs simply allow for the data to be sold off in pieces under smart contracts with fractional or full token share sales and purchases. Now, with being able to declare how a data creator, validator, miner, manager, distributor, and or user wishes to bifurcate those rights and maximize their benefits of them, a data creator could take a digital photo for example, and offer it for sale, lease and or license and or any custom terms and condition subsidization and or monetization that they feel is appropriate for the user. Data creators/distributors can take that even further by saying that the NFT and or NFR can be free to the public for one purpose or use but must be purchased for another use and leased for even another. Users can even make them options and or licensing rights with a balloon expiration date. This maximizes the NFT monetization opportunity to its fullest. There is no limit to the types of digital data one can use as an NFT and declare as a NFTBOR asset.

The term "NFR" refers to a non-fungible right based on the digital data bundle of rights (DDBR) on a layer zero (L_0) state channel HGTP, DAG, Web3 platform. Once the dynamic terms and conditions from the data creator/distributor and data acquisition/user are agreed to on each of their specific back-office dashboards, the terms and conditions will merge into an L_0, non-fungible right (NFR)/Digital Data Bundle of Rights (DDBR). This NFR will be able to provide private key access to the data procured and or negotiated.

The term "open platform and interoperable sensor participation" refers to data fusion between data sets of diverse sensor data that will be possible as data sensor nodes on the data exchange are onboarded. Users can add to their existing raw data and or model data by purchasing, leasing, and licensing the data as a layered solution for their new value-added data offered on the exchange. Sensors can be both on a standard centralized cloud aggregation model and or a decentralized inverted data aggregation network architecture model.

The term "near real-time data" refers to allowing universal computing nodes to be able to have a consensus with each other using a decentralized and distributed validation solution. The system allows for real-time as well as faster than real-time capabilities due to its scalability.

The term "historic data repository" refers to a storage location in which historic data can be submitted as a repository on the data exchange to provide for a data storage solution.

The term "discoverable data" refers to data integration and aggregation allowing for data depositories and repositories to be managed, to be discoverable, and to be accessible through an industry-specific data exchange query.

The term "Discoverable Trusted Verified Data with Integrity" refers to data exchange(s) combined with a decentralized L_0, hypergraph (HGTP), DAG, Web3, PRO, and digital wallet, that will be an agnostic range in data formats, and uses, but is not limited to, live data, raw data, modeled data, historic data, static and dynamic data, digital twin data, metaverse data, non-fungible tokens (NFTs), non-fungible token bundle of rights (NFTBOR), non-fungible rights (NFRs), telemetry data, remote data, stand-by data, and the like. The smart self-healing node-centric mesh network takes into consideration the following when creating an exchange for your data. This data has integrity data, immutable data, data chain of custody and memorization of events, data subsidization and monetization, smart shipping container and nodes, and L_0 distributed network.

The term "integrity data" refers to data that has been blockchain validated by consensus using the proof of reputation (PRO) node validation model to its original source as encrypted trusted data.

The term "immutable data" refers to a smart contract and state channel blockchain encrypted data that has been validated by node consensus on a decentralized HGTP, DAG, Web3, network, protocol, and platform.

The term "data chain of custody and memorization of events" refers to each block of data mined, blockchain validated, encrypted, and monetized with a state channel and or smart contract and data validation by proof of reputation (PRO), but can work with PoW and PoS, L1, and L2 networks. Allowing for all data to be agnostic and tracked through a chain of custody via blockchain node consensus validation, to provide for the data's original genesis source, where it is, and where it has gone permits the creating data creator/supplier to always know where their data is and be compensated for its use.

The term "data subsidization and monetization" refers to trusted, blockchain-validated data that can be created for the purpose and or the repurpose to be sold on the AMX exchanges to subsidize and or monetize the data via market maker blockchain data validation, data aggregation, and data railing by creating a platform for data query and industry-specific exchange uses.

The term "smart shipping container and nodes" refers to autonomous air, ground, and marine vehicles that will eventually be required to monitor and log all internal and external activity related to a transported container for safety and security. Containers come in all shapes and sizes. The smart self-healing node-centric mesh network looks at these transportation multimodal opportunities to evolve the containers into Smart Shipping Containers, Smart Cargo Containers, Smart Drone Containers, Smart Truck Containers, Smart Train Containers, Smart VTOL Containers, Smart Marine Containers, Smart Boat Containers, Smart Car Containers, Smart Travel Containers, etc., that allow for security, security risk assessment, situational awareness, content monitoring, observation and memorialization using sensor data both inside and outside of the container. The container business will need to evolve with edge, point-to-point, point-to-premises, and point-to-cloud data availability on a decentralized L_0, HGTP, DAG, Web3, PRO state channel platform.

In general, the present disclosure relates to a system for providing a smart, blockchain-based data exchange data storage device within a layer zero (L_0) self-healing node-centric blockchain mesh network, using DAG, Web3, State Channels, Constellation's Proof of Reputational (PRO) Observation, Node Consensus, that allows for decentralized cross-chain (blockchain) and cross-chain liquidity, with an agnostic, modular, scalable, P2P, P2C, cloud and or cloud at the edge via decentralized inverted aggregated architecture networking system, with near real-time, real-time and or faster than real-time using quantum processing, that uses with it full-spectrum frequency hopping, crypto, token, NFT, and NFR integration, according to the present invention. To better understand the present invention, FIG. 1 illustrates an example embodiment of a distributed computing environment containing a system for providing a distributed secure data exchange computing environment used to support autonomous devices having blockchain processing according to the present invention.

The smart self-healing node-centric blockchain mesh network data exchange system 100 communicatively couples a plurality of universal computing nodes 101a-d and 115a-b to a set of servers including a data exchange server 102, an air traffic control server 103a, a UAV delivery server 103b, a redundancy server 103d and other relevant servers. The universal nodes 101a-d and 115a-b are described in detail in the previously referenced concurrently filed US patent application. The air traffic control server 103, an app server-full stack front-end mobile application for users, operators, and vendors, (not shown), and the data exchange server 102 also are described in detail in the above US patent application. The delivery server 103b performs package pickup and delivery dispatch services including logging the UAV flights, UGV and ground robot autonomous and or physical driving of a multi-modal vehicle, inspections, ISRs, and or deliveries, as well as working with the air traffic control server 103a for flight trip route planning, in-air flight monitoring, and related air traffic control operations. All of these examples are associated with an example embodiment of a data exchange according to the present invention.

The universal computing nodes 105*a-b* are shown having a plurality of attached sensors 116*a-b* that generate data to be validated and included within the data exchange. The validated data is stored within the blockchain ledgers 115*a-n* that can be searched by users as described herein in reference to FIG. 7 below.

One example of the benefits of one decentralized data exchange can be demonstrated in aviation as it relates to weather and flight planning for situational awareness, detect and avoid object and terrain, and decision-making for beyond visual line of sight (BVLOS) drone operations. Existing weather sensor data is relied upon by public and private sector airports and aviation pilots throughout the world. However, there are data gaps between airports that do not allow for pilots to confidently rely on their flights to have accurate weather and situational awareness beyond the sensor's existing distributed data distance capabilities. This leaves the burden of adverse weather mitigation up to the pilot to differentiate between what might be a life-threatening situation that may be too late to divert from without adequate notice. Additionally, drones are authorized to fly from the surface (AGL) to 400 feet. Satellite capabilities lose strength and reliability between 3000-5000 feet from the surface.

The redundancy server 103*c* controls and communicates with all of the universal computing nodes 101*a-d*, 105*a-b* on the smart self-healing node-centric blockchain mesh network 131. The redundancy server 103*c* may detect a failure of an active universal computing node 105*a* from a failure to respond to communications with any other universal computing node in the smart self-healing node-centric blockchain mesh network 131. The redundancy server 103*c* also may be informed of a failure of one or more components, including sensors, by an active universal computing node 105*a* on the smart self-healing node-centric blockchain mesh network 131. Whenever a failure occurs, the redundancy server 103*c* determines the sensors attached to the universal computing node 105*a* that has the failure as well as determines the functions performed by this universal computing node 105*a* within the smart self-healing node-centric blockchain mesh network 131.

With this information, the redundancy server 103*c* identifies other universal computing nodes 105*b* within the smart self-healing node-centric blockchain mesh network 131 that may replace the functionality of the failed computing node and coordinates the failover of the existing functions of the failed computing node to its replacement node. This failover may include transferring any data stored within the failed node to the replacement node. The failover also may include transmitting a message to one or more universal computing nodes and servers on the smart self-healing node-centric blockchain mesh network 131 that the failover is occurring. The other nodes in the smart self-healing node-centric blockchain mesh network 131 may update their configuration data to address all data requests and related communications that had been assigned to the computing that has failed to the replacement computing node. As such, the entire system within the smart self-healing node-centric blockchain mesh network 131 continues to operate after a brief failover as if the failure had not occurred. Data is also validated by a cluster of a minimum of two nodes and up that validates the data is trusted data using a proof of reputation (PRO) and observation of the data on the decentralized blockchain node-centric mesh network.

It should be noted that the present invention uses data exchanges disclosed within the commonly assigned US patent application referenced herein to store all of the data found on each universal computing node in the preferred embodiment. Data can also be cloud stored at the edge and processed at the edge as a P2P, P2C feature that can be on an inverted aggregated data, time and processing fractalized cloud server, where the data geniuses are created. As disclosed herein, the data exchanges utilize a blockchain ledger 115*a* to store this data for retrieval upon request. Because a blockchain ledger 115*a* automatically transfers all blockchain records 500, as described below, to multiple universal computing nodes to be added to multiple copies of any particular blockchain ledger 115*a*, and because a blockchain record 500 is not included in a blockchain ledger 115*a* until the inclusion of the record has generated a matching blockchain checksum or similarly computed value generated from the addition of the record to the ledger, very little data is expected to be transferred from a failing computing node to its replacement node as part of the failover or out of characteristic proof of reputation observation (PRO) process. Data redundancy and availability are automatically maintained by the smart self-healing node-centric blockchain mesh network 131 with the use of the blockchain ledgers.

The redundancy server 103*c* may maintain a failover database 113*c* that contains rules for how particular node failures and or out-of-character bad data are to be handled. These rules may be specified for each universal computing node within the smart self-healing node-centric blockchain mesh network 131 or may be specified by groups of similarly functioning universal computing nodes as appropriate. The redundancy server 103*c* may generate messages to system operators, node and data exchange owners, and any other interested party to inform these individuals of the failover event. The transmission of these messages may initiate a service request for maintenance and repair of the universal computing node that has caused the failover event.

The delivery server 103*b* permits external users to access the smart self-healing node-centric blockchain mesh network-based data exchange system 100 to request and schedule the services of a UAV 125 to perform a flight on their behalf. With respect to the smart self-healing node-centric blockchain mesh network-based data exchange system 100, the delivery server 103*b* provides an ordering and scheduling service to cause a UAV 125 to schedule a flight to inspect a location of an object. The request may include requirements of the UAV 125 such as the resolution and characteristic of the imaging device contained within the UAV 125, the range and ability to plan a flight to a location over a particular flight path, and the available schedule for a flight that meets any time or weather requirements of the user requesting the inspection be performed. The delivery server 103*a* may coordinate the creation of a flight path with the air traffic controller server 103*a*. All of the data associated with the request for a flight, its scheduling, its status, and results may be maintained within a data exchange as otherwise disclosed herein for use by the repair report generator 154 and any other use of the smart, self-healing blockchain-based data exchange. The same data can use artificial intelligence and machine learning to avoid objects and terrain either internally or by third-party applications using APIs, SDKs, and or firmware that are available for their external operations or participation without this system.

Examples of systems that may be implemented using a set of processing nodes 110-113 including autonomous flying devices that utilize computing nodes are described in more detail in U.S. patent application Ser. No. 16/866,484, titled "Smart Drone Rooftop and Ground Airport System," and filed on May 4, 2020, that itself claims priority to U.S. Provisional Patent Application No. 62/842,757, filed May 3, 2019 titled "Universal Automated Artificial Intelligence Rooftop UAS/UAV Drone Port/Airport Station For General Purpose Services Of Robotic UAS/UAVs, And Its Supporting Hardware & Equipment Related To: Loading/Unloading Deliveries, Deployment/Arrival, Dispatching, Air Traffic Control, Charging, Storing/Garaging, De-Icing/Anti-Icing, Meteorological & Data Dissemination/Retrieval, Big Data Mining And Mimo Network Services" and the U.S. Provisional Patent Application Ser. No. 17/187,871, titled "Smart City Smart Drone UAS/UAV//VTOL Mailbox Landing Pad" filed on Feb. 28, 2021, that claims priority to U.S. Provisional Patent Application No. 62/983,486, titled "Smart City Smart Drone UAS/UAV//VTOL Mailbox Landing Pad", filed Feb. 28, 2020. As well as the Smart Delivery Doorbell and Chime Miner and Smart Drone Landing Pad Miner. U.S. Provisional Patent Application, Ser. No. 63/322,579, titled "Smart Delivery Doorbell and Chime Data Blockchain Miner with Crypto and Token Integration and Smart Drone Landing Pad Data Miner," filed Mar. 22, 2022. All of these applications are incorporated herein as if recited in their entirety.

The present invention addresses the limitations of prior solutions to these problems while working with other components of a Smart Drone Rooftop and Ground Airport System and the Smart Mailbox Landing Pad IP system. Using its AI-Machine Learning in a Delivery Drone Network, Universal Computing Nodes in a Distributed Computing Environment, and Low Latency Scalable, Modular, agnostic data and interoperable hardware using Blockchain Weather Data Exchange IP that will allow for the communication of sensors that are strategically positioned on top of existing building rooftops and vacant ground surroundings that have been repurposed as drone and vertical takeoff and landing vehicle (VTOL) smart airport/vertiport infrastructure. Each time a smart drone airport/vertiport is added to a roof, national air space (NAS) is safer, and each time-integrated sensors are daisy-chained on smart airport/vertiports data gaps are filled between existing airports. Operators of aircraft, drones, unmanned vehicles, and robots will be able to rely on decentralized weather data, once not available, and will be willing to pay for it because it has been validated. The operation of this system is described in detail in the related US patent applications cited above.

One of ordinary skill in the art will recognize that the above applications of universal computing node technology within a distributed processing system in support of autonomous flying devices may also be used as multi-modal transportation hailing full-stack system of people and cargo in autonomous marine and ground-based environments in similar ways. Additionally, the use of universal computing node technology within a distributed processing system may be used to solve other data processing problems that arise as data is collected from sensors located across a large geographic area while the data from all of these sensors may be combined to represent data across the large geographic area at varying resolutions. Such data can be used as a Digital Twin for predictive analytics, maintenance, and sensor life-cycles.

For example, local weather data may be collected from environmental sensors located adjacent to the distributed processing nodes that may be useful for autonomous devices within the geographic area at a fine resolution to operate as weather condition changes. The same weather data may be combined at a coarser resolution for route planning of the autonomous devices across the geographic area in weather daisy-chained architecture. Even larger resolution weather data may be used for applications at regional and national levels. Even at a local level for density weather data, a Smart Delivery Doorbell and Chime Miner, Smart Drone Mailbox Landing Pad Miner, and or Smart Drone Landing Pad Miner with weather sensors on it may be used for departure and arrival data information, in addition to the weather sensor payloads on the en-route drone that provides for a full departure, en-route and arrival of weather situational awareness, right to the doorstep of the end-user. The use of the distributed processing nodes to process the raw weather data in increasingly larger areas with larger resolution allows all of these data representations of the same weather data to be generated using processing and data raw and or by fusion and combining algorithms in a number of computing nodes. This processing utilizes the combined processing capacity of all of the computing nodes to permit large amounts of data to be processed simultaneously that may generate near-real-time, real-time, and even faster than real-time predictive analytics results for all of these levels of usage. Of course, similar applications to weather processing from many other industries are easily supported in similar manners.

Additionally, the provision of a data exchange used in an autonomous UAV delivery system is one example embodiment of a data exchange that may be implemented by the present invention. The sensor data of the universal computing node obtained at the edge of a distributed computing environment may be any generated data that may be processed and stored onto a blockchain ledger. The generated data may be validated as disclosed herein to become validated data that may be trusted to the extent that the operator of the particular computing node generating the data may be a trusted source of data. The validated data, regardless of content, may be searched by query using creator/distributor and data acquisition user back-office dashboards that dynamically allow the negotiation of the terms and conditions of the two dashboards where a final non-fungible right (NFR) will be created from it and identified using the metadata as disclosed herein. The validated data also may be acquired with a set of access rights as disclosed herein. The present invention is not intended to be limited to any particular example embodiment described here and is defined by the limitations recited within the attached claims.

The data exchange server 102 has positioned itself to be hardware (node) and software agnostic. The open platform is a scalable, interoperable, and modular autonomous node-centric blockchain mesh network infrastructure of blockchain verified and consensus of PRO data, on a layer zero (L_0) and state channel HGTP, Web3, DAG traditional central cloud, edge cloud, and or inverted aggregated cloud architecture network, which can be daisy-chained for situational awareness and detect and avoid features between nodes such as autonomous drones, manned aircraft, and manned and unmanned ground vehicles sensors, landing pads, vertiports, charging stations, drone ports, smart delivery doorbell, and chime miner, smart drone landing pad miner, and other infrastructure hardware that can also be modified to provide as a data miner at the edge. This creates a BVLOS commercially viable, scalable, modular, environmentally, and economically sustainable both through traditional and tokenomics crypto/token utility solutions for the UAV and other industries. The Vertiport-in-a-Box (VIB) solution allows the system to integrate custom use case partners that provide autonomous hardware for air, ground, and marine vehicles and software data sensors using our node application. The VIB solution can be offered with financing payments with amortization terms that may also be used to later sell as a Data-Backed Security(DBS) because it is an asset-backed security that can be rated from DISC's Data Rating Service(DRS) IPs.

More generically, the present invention provides the first true data exchange. In order to provide for a decentralized location where data can be discoverable and queried, an Autonomous Mobility Data Exchange (AMX), will support an autonomous market maker data exchange for data suppliers and data acquisition users. This exchange will be launched from the Lattice Launch Pad on a state channel, layer zero (L_0) HGTP, Web3, and DAG network, where AMX will have multiple industry-specific exchanges which will come out in stages. These exchanges are a combination of AMX Pools, AMX Network Architecture, and AMX Sub-Exchanges.

The AMX Pools use crypto and token economics and network bandwidth for crypto and or token pools for specific categories. AMX will use sub-exchange proposal pools, data supplier access pools, user access pools, and user supplier pools.

The AMX architecture must have the flexibility and dexterity of an open network, crypto, digital wallet platform, and token exchange. The present invention models both provided this solution. Key elements to achieve this goal are for the architecture to be industry decentralized (DeFi) and or inverted aggregated data architecture network, that is data agnostic, open platform, interoperable, modular, scalable, multi-exchange data storage for the depository and repository of data, data-on-demand, static data, and dynamic data that can be converted into a non-fungible right(NFR).

The AMX also provides for industry-specific sub-exchanges and cross-sub-exchanges. These exchanges include a weather data exchange, a drone delivery data exchange, and industry-specific sub-exchanges. These industry-specific exchanges will allow for data to be discoverable on a specific exchange. The AMX architecture also will allow users to repurpose data on multiple industry exchanges.

An HGTP horizontal hypergraph requires projects to create liquidity and bandwidth pools to access the network and create liquidity of L_0 tokens. The present invention requires liquidity and bandwidth support for its smart delivery drone mobile application. Social and Loyalty crypto/token rewards can be given to end-user, operators, and or vendors that participate in the smart delivery drone mobile application. Through a staking program, the present invention provides liquidity providers rewards with tokens as an APY. The Platform Community Token Rewards program will be used to support the liquidity pool. As a data provider onboards, for example, a traditional and non-traditional manual and autonomous smart drone, smart landing pad, smart mailbox landing pads™, smart charging station, smart container, smart delivery doorbell, and chime miner, smart drone landing pad miner, UGV, robot, eVTOL, UMV, sensors, data miners, mobile driver, and user apps as a hardware node to the network, the needed throughput on the hypergraph network will be increased and supported. The present invention provides these node solutions through its smart node-centric mesh network in collaboration with the Hypergraph network. The cross-connection of the nodes communicating also allows for artificial intelligence and machine learning (AIML).

Figure 2:
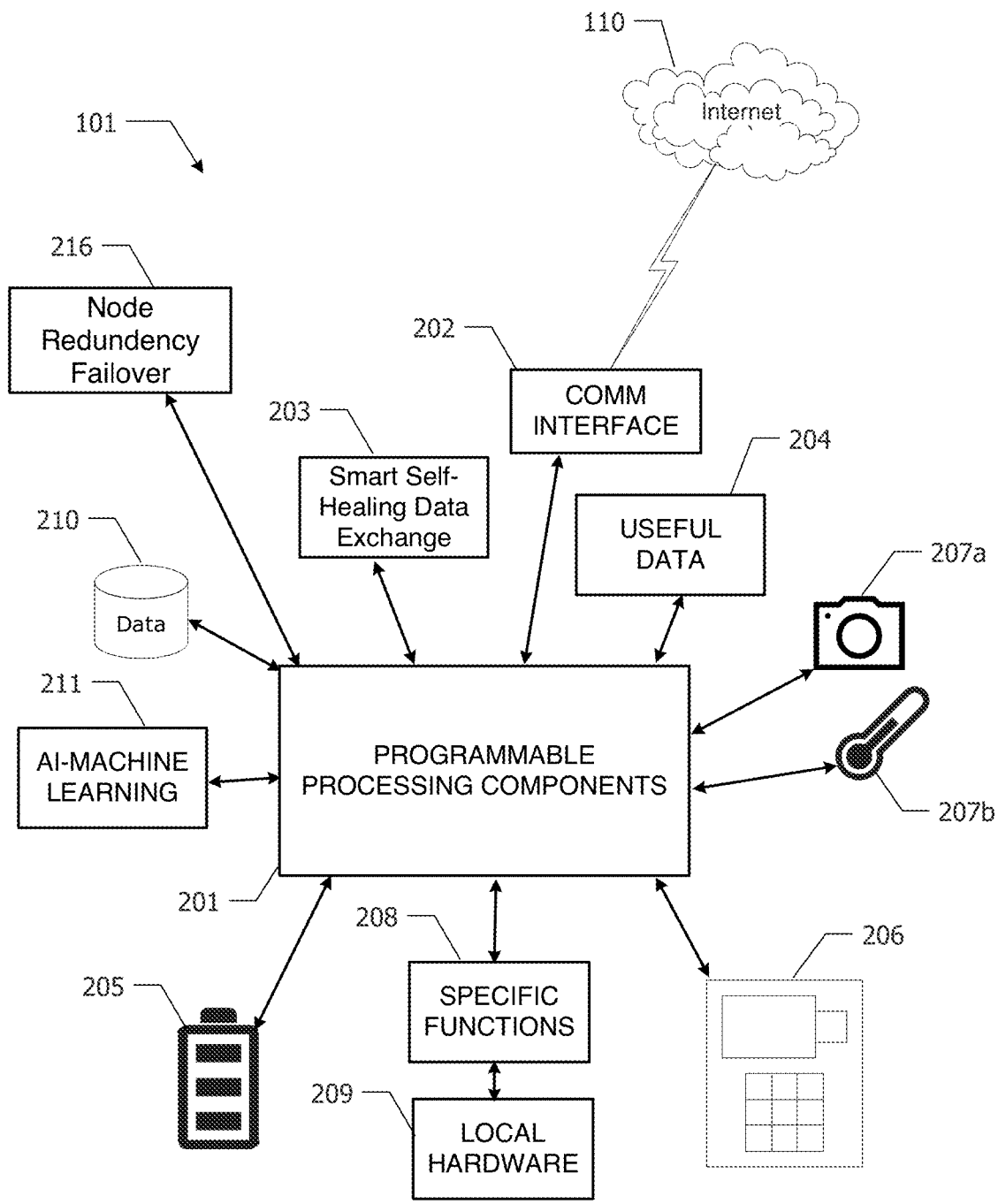
FIG. 2 illustrates a universal computing node for use in a system for providing smart, blockchain-based data exchange data storage devices within a self-healing node-centric blockchain mesh network according to the present invention.

FIG. 2 illustrates a universal computing node for use in a system for providing a smart, blockchain-based data exchange data storage device within a self-healing node-centric blockchain mesh network according to the present invention. A universal computing node 105a may operate to perform any function that may be implemented in software containing executable instructions within an application. The computing node 105a may receive an application from a remote source such as an application server 103c that may work with local hardware 209 and local input devices such as imaging devices 207a and weather sensors 207b. The utilization of the application server 103d permits the development and usage of additional devices attached to the computing node 101 as needed to perform desired functions. The local hardware 209 and local input devices 207a-b permit the inclusion of additional components that permit the computing node 105a to be universal in its possible functions.

The computing node 105a as disclosed herein is within a larger system that supports the use of UAV 125 to perform autonomous deliveries of packages from vendors to purchasers using the smart mailbox landing pads to accept deliveries and provide pickup locations of these packages as disclosed within the above-cited and pending US patent application. The smart mailbox landing pads perform all of the functions to communicate with a UAV 125 as it approaches the smart mailbox landing pad to make a delivery including identification and authorization to land and deliver packages as well as provide secure retention of the delivered packages until retrieved by a user. Any particular smart mailbox landing pad is typically in use a small portion of the time and for most instances, the computing node 101 within the smart mailbox landing pad is available for other purposes.

The computing node 105a supports these other purposes by permitting the attachment of the local hardware 209 and the local input devices 207-a-b to provide data to be generated for use by the UAV 125 and related air traffic server 103a functions needed by the UAV 125. For example, the local input devices 207-a-b may include any number of weather sensors 207b including temperature, wind speed, air pressure, humidity, precipitation, and the like. The local input devices 207-a-b also may include an imaging device 207a that can provide real-time images of present weather, road conditions, and traffic levels around the smart mailbox landing pad miner, smart delivery doorbell miner, and or smart landing pad miner. Because the smart mailbox landing pads are typically located throughout a geographic area in which users are located, the inclusion of the local input devices 207a and weather sensors 207b is capable of providing critical real-time data for the UAV 125 and the air traffic servers 103a when planning and monitoring the flight paths of the UAV 125 as they occur.

All of the data generated by computing node 105a may be transmitted to other computing nodes and servers for use as appropriate. The generated data also may be included within a secure data exchange for possible sale and use by any other computing systems. Additionally, the computing node 105a also may provide general computing capacity including computing operations and data storage that may be sold to other users in need of these services such as processing, storing, mining, network time-sharing, inverted aggregation of data at the edge on an edge cloud architecture network and or fractalization of data and networks as an example. As such, the computing capacity of the computing node 105a which is available when a UAV 125 is not engaged with the computing node 105a is repurposed for these other usages.

Additionally, the functions performed by the computing node 105a may change over time as needed. The computing node 105a may download multiple applications from the application server 103d and time share the computing capacity of the computing node 105*a* to support different computing usages. The computing node 105*a* also may be within the UAV 125 in which the local hardware 209 and the local input devices 207-*a-b* correspond to the flight data inputs and flight controls of the UAV 125 needed to proceed along a flight path. Of course, the computing nodes 105*a* also may be used in other devices and locations other than smart mailbox landing pads and similar hardware.

Additionally, the functions of the computing node 105*a* may utilize artificial intelligence and machine learning (AIML) using the sensor data 207-*a-b* of the computing node 101 to determine the operation of the computing node 105*a* when similar conditions arise within the sensor data 207*a-b*. The applications downloaded by the computing node may include and/or utilize these AIML functions throughout the operation of the computing node and its software components of FIGS. 5*a-c*. The nodes can be used for Digital Twin that can provide for data analytics such as hardware lifecycles, traffic management, maintenance, and real-time simulations.

Figure 3:
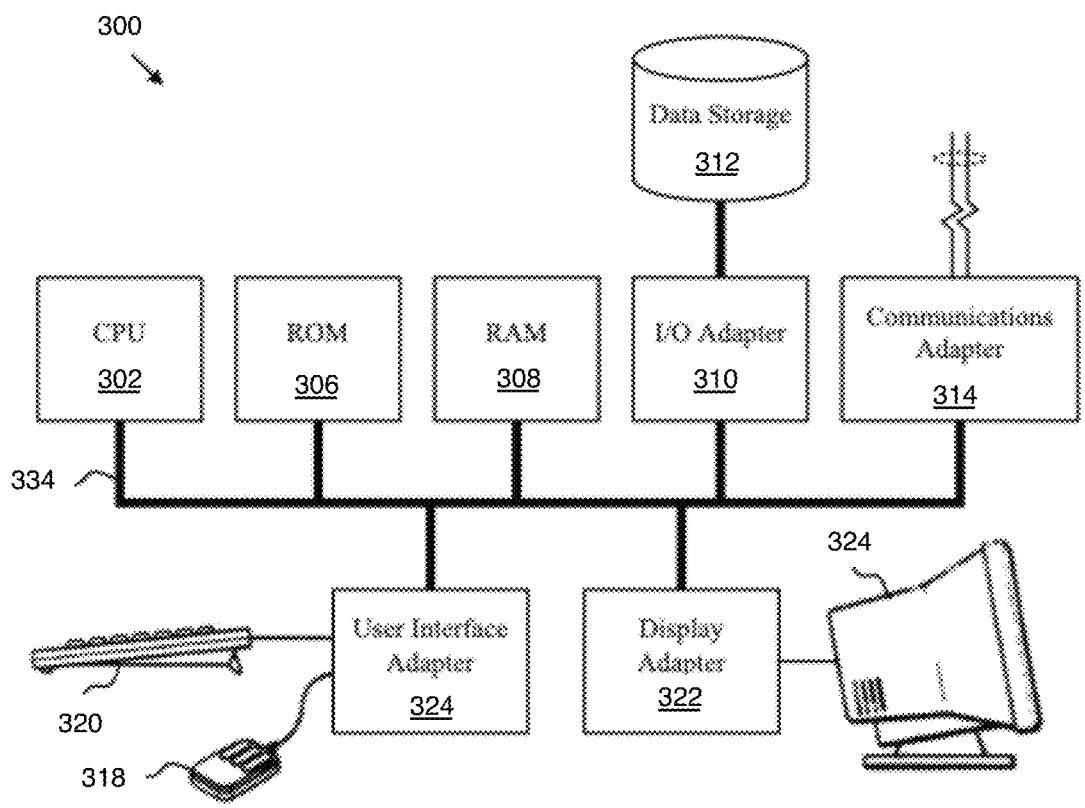
FIG. 3 illustrates a functional diagram of a generic computing system that may be used as part of a system for providing a smart, blockchain-based data exchange data storage device within a self-healing node-centric blockchain mesh network according to the present invention.

A computing node 105*a* of FIG. 3 may be constructed using one or more components including a set of programmable processing components 201, a communications interface that provides for a full spectrum frequency hopping of communications 202, a smart, self-healing blockchain-based data exchange device 203, useful data 204, a power source 205, an input control device 206, one or more external sensors 207*a-b*, a set of specific processing functions 208, local hardware components 209, local data storage 210, and AI-machine learning functions 211.

The set of programmable processing components 201 includes all of the programmable hardware and memory used to create a computing device that may operate as a computing node 105*a*. A computing system is described in more detail with regards to FIG. 3 below.

The communications interface 202 permits the programmable processing components 201 to communicate with remote user computing devices 102*a-b* and 101*a-d*. The communications interface 202 performs all of the data formatting, computer-to-computer communications, encryption processing, and all similar operations needed by the programmable processing components 201 to communicate with other nodes 101*a-d* and servers 102*a-b*.

The smart, self-healing blockchain-based data exchange device 203 is a data storage system that is used to capture, mine, validate, log or ledger, and maintain data onto a blockchain-based ledger for retrieval by the computing nodes 101*a-d* and other computing systems. The smart, self-healing blockchain-based data exchange device 203 contains blocks of encrypted data and uses blockchain processing to ensure that the data retrieved from the smart, self-healing blockchain-based data exchange device 203 is accurate and not corrupted. Blockchain processing stores data in multiple blockchain ledgers on different computing systems using all entries in the ledger in the computation of data stored into each block of data stored on the ledger such that any changes to a data entry in one of the data blocks added to the smart, self-healing blockchain-based data exchange device 203 would cause all subsequently added data blocks to identify an error when retrieved and decrypted. A simplified description of blockchain processing may be found at https://www.linkedin.com/pulse/how-does-blockchain-work-dummies-explained-simply-collin-thompson/which is incorporated herein in its entirety.

Because the smart, self-healing blockchain-based data exchange 203 requires identical ledgers to be maintained in multiple computing systems, the inclusion of a blockchain ledger 203 in each of the computing nodes 101*a-w* provides distributed processing systems that run in parallel to maintain the multiple copies of a particular ledger using a decentralized layer zero HGTP hyper transfer protocol and directed acyclic graph (DAG). A data block retrieved from the blockchain ledger 203 that matches a copy of the same data blocks from other computing nodes may be trusted to be an accurate copy of the data block when stored onto the smart, self-healing blockchain-based data exchange device 203.

The smart, self-healing blockchain-based data exchange device 203 may be used to store any type of data that is generated or processed by computing systems. In the systems noted above that relate to autonomous devices, a smart, self-healing blockchain-based data exchange device 203 may be useful to record data of the various flights of the autonomous flying devices, including the date and time of each flight segment from a point of takeoff, a point of a destination, locations of any waypoints followed in a flight, weather data associated with the particular flight, and any information regarding the purpose of the flight, the cargo transported in the particular flight, and any point of sale information related to the cargo. As noted in the UAV descriptions, the computing nodes may be associated with rooftop airports, smart mailbox landing pads, smart delivery doorbell, and chime miners, smart delivery landing pad miners, and related devices that are spatially distributed across a geographical area that have functions associated with the distributed devices that have computer control functions. The smart, self-healing blockchain-based data exchange device 203 and associated processing may proceed as background processing functions when the computing nodes 101*a-d* are not needed by the autonomous flying device control system.

Useful data 204 may be generated by each computing node 101*a-d* based upon the functions and devices that are part of a particular computing node. For example, a computing node 105*a* may collect local data from attached sensors 207-*a-b* to computing nodes 105*a* that are spatially distributed across a geographical area. Real-time weather data is one type of data that may be captured at a larger number of computing nodes 105*a* across a geographical area. All of the weather data from all of the computing nodes 101*a-d* may be combined into a real-time view of weather conditions across the geographical area. This weather data may be combined into a common weather map using a set of processing nodes 110-113. This weather map may be useful to a UAV control network; additionally, this weather map data may be useful to other users on the Internet 110. As such, the weather maps may represent one type of useful data that is generated and maintained in a computing node 105*a* that may be provided to other systems to increase revenue generated by the set of processing nodes 110-113.

The power source 205 may be used to provide electrical energy to operate the computing node 105*a*, any attached sensors 207*a-n*, local hardware components 209, and network communication functions associated with each computing node 105*a*. Certain computing nodes 105*a* and related attached devices may be located when a power connection to a power grid is difficult and expensive to be provided. Additionally, other computing nodes 105*a*, such as computing nodes 105*a* that is part of UAVs, may be mobile devices that require a self-contained power source. The power source of the present invention 205 may comprise a Tritium™-based power source that provides a power source having a long useful life providing electrical power. Examples of these power sources may include many types of self-charging, nano-diamond, and diamond nuclear voltaic batteries. Other long-life power sources include solar power devices, hydrogen power generating devices, and similar nuclear-based power sources having a useful long life.

The input control device 206 provides input and output processing to provide operators of the computing nodes with messages and data needed to control the operation of the computing node 105a and its functions. This input control device 206 also accepts commands from a user to instruct the application in the computing node 105a to perform particular tasks.

The one or more external sensors 207-a-b may be connected to each computing node 101 to provide data that may be useful for the functions performed by a particular node. As noted above, a computing node 105a may collect local data from attached sensors 207-a-b to computing nodes 101 that are spatially distributed across a geographical area. This local data may include images, video, and audio data from a camera device 207a that provides a real-time view of an area about the computing node 105a. This local data also may include weather data from sensors 207b that measure weather data including temperature, wind speed and direction, humidity, barometric pressure, and precipitation, among other data values. The computing node 105a may collect the data values from these sensors 207-a-b to provide to other computing devices on the Internet 110 as well as use the data values to generate other data that may be useful to other processing nodes 101a-d and other computing devices.

The set of specific processing functions 208 may be part of a computing node 105a to control local hardware components 209 that are part of the location of the computing node 101. For example, a computing node 105a may be part of a rooftop airport or a smart mailbox landing pad that is used to launch and receive autonomous flying devices. The airports and smart mailboxes may require processing functions to communicate with the autonomous flying devices as part of the control of these flying devices. Additionally, a smart mailbox may include components that open and close to provide storage for mail and packages to be received when an autonomous flying device arrives at the smart mailbox. The set of specific processing functions 208 may control the operation of the smart mailbox as well as notify a user of the arrival of a package as appropriate. The set of specific processing functions 208 provides all processing functions to support the devices that are associated with the computing node 105a at a particular location.

The local hardware components 209 are the physical components to permit the computing node to operate as a specific device. For example, a smart mailbox, as noted above, may have devices to communicate with the autonomous devices, accept packages from the autonomous devices, and communicate with users about the arrival of a package by the smart mailbox. These local hardware components 209 are used to allow the computing node 105a to function as any particular device or system.

The local data storage 210 contains semi-permanent and permanent data storage devices to store data used by software applications executed by the computing node 105a, store and provide data as needed to the software applications executed by the computing node 105a, and store various software applications that may be used to dynamically configure a computing node 105a from one set of processing functions to another set of processing functions. The local data storage may be contained within devices attached to the location of the computing node 105a as well as be contained within devices communicatively connected to the computing node 101 over the Internet 105a.

The AI-machine learning functions 211 may be included within a computing node 105a to assist in functions to be performed by the computing node 105a and its attached devices. As the state of AI-machine learning functions continues to mature, the inclusion of these functions may be useful in a large number of areas. For example, computing nodes 105a that is part of an autonomous device network may include a number of functions associated with the control of the autonomous devices, the routing of the autonomous device travel paths, the detection of dangerous conditions associated with local weather conditions and possible in route collisions, situational awareness for detection and avoidance of possible collisions between the autonomous devices, and dynamic rerouting of autonomous devices as needed. All of these processing functions may benefit from the use of AI-machine learning functions 211 to provide improved functioning of the computing node 105a based upon data obtained from the particular location of the computing node 105a.

Edge universal computing nodes can communicate peer-to-peer, point-to-point, and point-to-cloud, and is agnostic with other nodes who wish to transfer data onto the network. Near real-time daisy-chaining of data between nodes can create an AIML environment between nodes communicating on the smart node-centric blockchain mesh network.

For the example embodiments disclosed herein, the universal computing nodes are disclosed as computing devices used in a system of UAVs working in combination with Smart Mailbox Landing Pads, Smart Delivery Doorbell, and Chime Miners and Rooftop UAV Airports and Landing Pads as disclosed above. These universal computing nodes also may collect and share local weather data at the corresponding universal computing node for use by the UAV and related systems as well as provide data to be included within a Weather Data Exchange as described in detail herein. The Smart Delivery Doorbell and Chime Miner, for example, may show if the owner of the device allows for a delivery flight over their specific airspace by providing the device and property owner the choice to participate in fly-over property services. Specific authorizations and permissions for drone flyover services may be rewarded by crypto, token, and or NFT social and or loyalty rewards. One of ordinary skill in the art will recognize that the universal computing nodes also may be used in many other distributed computing systems and low latency blockchain data exchanges. The embodiments of the UAV systems and weather data exchange are described as a representative examples of embodiments of the present invention. These embodiments are not intended to limit the scope of the present invention except as recited in the limitations of the attached claims.

FIG. 3 illustrates a functional diagram of a generic computing system that may be used as part of a system for providing a smart, blockchain-based data exchange data storage device within a self-healing node-centric blockchain mesh network according to the present invention. FIG. 3 illustrates a computer system 300 adapted according to certain embodiments of the server and/or the user interface device for use as a distributed computing node according to the present invention. The central processing unit ("CPU") 802 is coupled to the system bus 334. The CPU 302 may be a general-purpose CPU, quantum processor and or microprocessor, graphics processing unit ("GPU"), nano processor, and/or microcontroller. The present embodiments are not restricted by the architecture of the CPU 302 so long as the CPU 302, whether directly or indirectly, supports the operations as described herein. The CPU 302 may execute the various logical instructions according to the present embodiments.

The computer system 300 also may include random access memory (RAM) 308, which may be synchronous RAM (SRAM), dynamic RAM (DRAM), synchronous dynamic RAM (SDRAM), or the like. The computer system 300 may utilize RAM 308 to store the various data structures used by a software application. The computer system 300 may also include read-only memory (ROM) 306 which may be PROM, EPROM, EEPROM, nano storage, quantum storage, optical storage, or the like. The ROM may store configuration information for booting the computer system 300. The RAM 308 and the ROM 306 hold user and system data, and both the RAM 308 and the ROM 306 may be randomly accessed.

The computer system 300 also may include an input/output (I/O) adapter 310, a communications adapter 314, a user interface adapter 316, and a display adapter 322. The I/O adapter 310 and/or the user interface adapter 316 may, in certain embodiments, enable a user to interact with the computer system 300. In a further embodiment, the display adapter 322 may display a graphical user interface (GUI) associated with a software or web-based application on a display device 324, such as a monitor, display, or touch screen device of any kind.

The I/O adapter 310 may couple one or more storage devices 312, such as one or more of a hard drive, a solid-state storage device, a flash drive, a compact disc (CD) drive, a floppy disk drive, and a tape drive, to the computer system 300. According to one embodiment, the data storage 312 may be a separate server coupled to the computer system 300 through a network connection to the I/O adapter 310. The communications adapter 314 may be adapted to couple the computer system 300 to the network 110, which may be one or more of a LAN, WAN, HGTP, DAG, Web3, inverted edge network architecture network and/or the Internet. The communications adapter 314 also may be adapted to couple the computer system 300 to other networks such as a global positioning system (GPS) or a Bluetooth network. The user interface adapter 316 couples user input devices, such as a keyboard 320, a pointing device 318, and/or a touch screen (not shown) to the computer system 300. The keyboard 320 may be an on-screen keyboard displayed on a touch panel. Additional devices (not shown) such as a camera, microphone, video camera, accelerometer, compass, and or gyroscope may be coupled to the user interface adapter 316. The display adapter 322 may be driven by the CPU 302 to control the display on the display device 324. Any of the devices 302-322 may be physical and/or logical.

The applications of the present disclosure are not limited to the architecture of the computer system 300. Rather the computer system 300 is provided as an example of one type of computing device that may be adapted to perform the functions of a universal distributed computing node 101*a-w*. For example, any suitable processor-based device may be utilized including, without limitation, personal data assistants (PDAs), tablet computers, smartphones, computer game consoles, and multi-processor servers. Moreover, the systems and methods of the present disclosure may be implemented on application-specific integrated circuits (ASIC), very large-scale integrated (VLSI) circuits, state machine digital logic-based circuitry, or other circuitry.

The embodiments described herein are implemented as logical operations performed by a computer. The logical operations of these various embodiments of the present invention are implemented (1) as a sequence of computer-implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules. As such, persons of ordinary skill in the art may utilize any number of suitable electronic devices and similar structures capable of executing a sequence of logical operations according to the described embodiments. For example, the computer system 300 may be virtualized for access by multiple users and/or applications.

Figure 4:
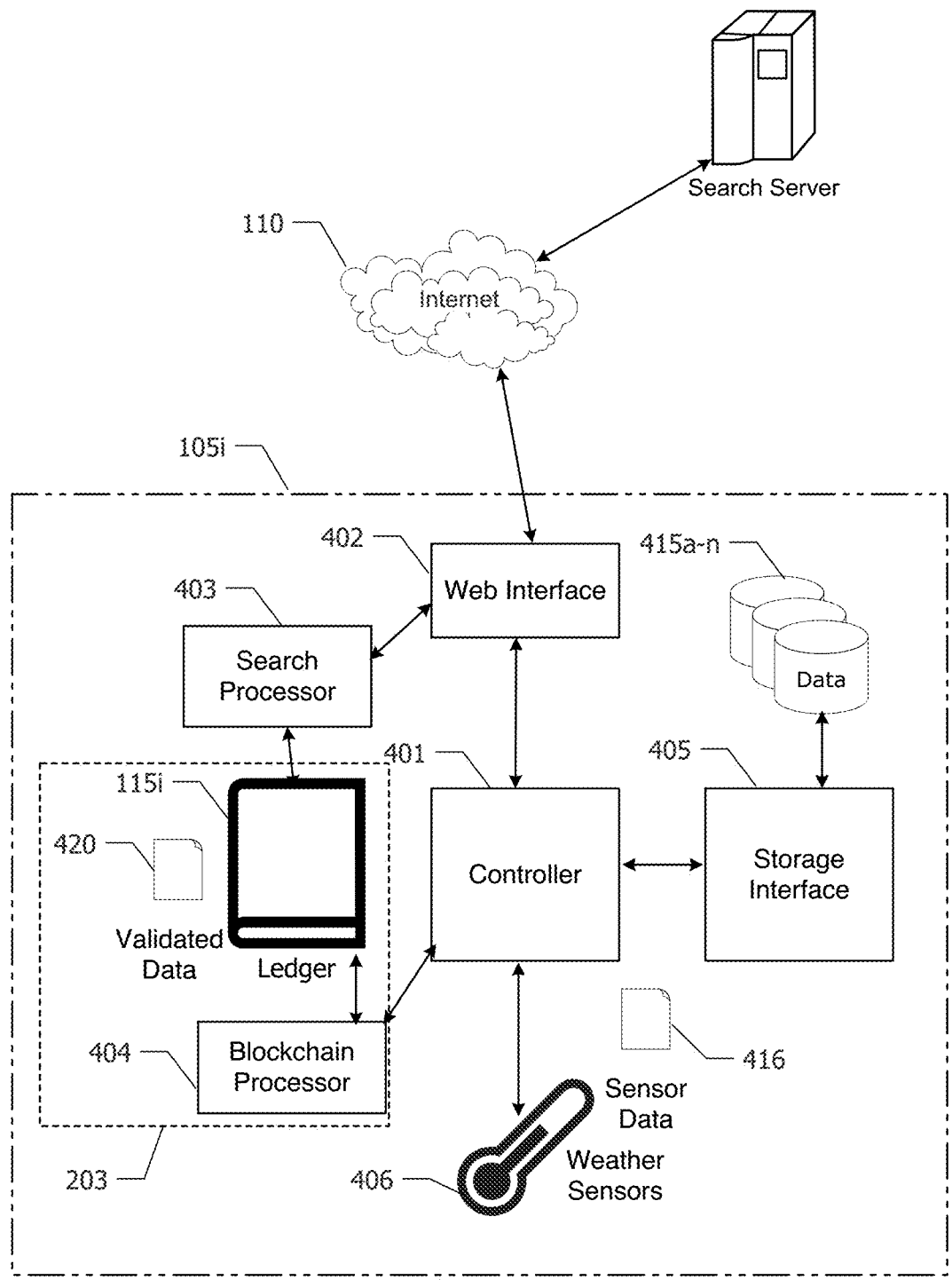
FIG. 4 illustrates the components of a universal computing node that may be used as part of a system for providing smart, blockchain-based data exchange data storage devices within a self-healing node-centric blockchain mesh network processing according to the present invention.

FIG. 4 illustrates a data exchange validated data record that may be used as part of a system for providing a smart, blockchain-based data exchange data storage device within a self-healing node-centric blockchain mesh network according to the present invention. The smart self-healing node-centric blockchain mesh network data exchange system 100 of the present invention is an open platform that is hardware agnostic and software interoperable for all participating stakeholder manufacturers. The validated data can be blockchain validated through a Blockchain Validation as a Service (BVDaaS) solution. Once this data is trusted with integrity and scored for its reliability, it can be repurposed for sale, lease, license, use and/or reuse, through a discoverable dashboard query on a specific data exchange(s) with a smart contract, state channel, non-fungible token (NFT) and or non-fungible right (NFR). The present invention provides this solution to make the existing models of autonomous infrastructure commercially viable and sustainable through the subsidization and monetization of the participating stakeholders near real-time and/or historic repurposed data supplied.

Aside from BVDaaS, NFT, and NFR solutions, additional vertical markets in this commercial building sector can be further broken down to accommodate an understanding of the building activity by the tenants and how it can relate to drone delivery revenue. One example of how the process works can be demonstrated in the bullet points below:

- Onboarded Strategic Hardware Manufacturer Partners are integrated with nodes on a smart node-centric operating system for direct edge computing.
- Sensor Data Suppliers supply data using their sensors through direct node point-to-point and/or point-to-cloud services. This data can be used with their own operations related to a fleet of drones, drone customers, and or sensors.
- Consumer retail or food end-user orders come in from the smart node-centric mesh operating system's Smart Delivery Drone Mobile App on a mobile phone.
- Smart Antennas having full-spectrum frequency hopping for communication and or cloud networking allowing for a shared time at the edge, cyber inflation monetization, processing sharing, memory and storage sharing, inverted/reversed aggregated data network architecture to be able to have any data, any device, anywhere, any frequency and any blockchain and any network.
- The order is processed using the end-user's mobile device or online.
- Blockchain origination begins on the end-user side of the participating app user.
- Blockchain origination begins as participating drones, smart delivery doorbells and chime miners, smart drone landing pad miners, smart drone miners, smart container miners, smart mailbox landing pad miners, landing pads, charging stations, drone ports, drone hangers, drone containers, that are being used in the storage, charging, departing, enroute and or arriving operations, which use sensor payloads on the edge (point) of the network, to begin the sensor data blockchain validation process of planning, approving, and executing the operational delivery objective.

On the point-to-point side of the hardware, AIML allows for all participating nodes (hardware) to edge compute and communicate with each other to share and learn information that is mission-critical. This information can be weather conditions, object detection, and or hardware health, to name a few. Data that needs to go through the cloud will go directly to the data exchange. This information allows for beyond visual line of sight (BVLOS), through situational awareness, autonomous decision-making, detecting and avoiding objects and adverse weather avoidance, minimizing grounding of operations, and turn-key operational fulfillment.

Alternatively, an end-user can use Smart Mailbox Landing Pad and order on its digital touch screen interface between any of the competing shipping carrier delivery services such as USPS, FedEx, UPS, and/or DHL. The landing pad cavity can be rental space available for different companies to use for their own private blockchain network and CPU.

During this process, participating strategic partners and stakeholders can opt into having the data bifurcated into near real-time streaming or placed in a repository to be sold on data exchanges.

Data End-users can now go to the specific data exchange of interest and purchase, lease, license, use and/or reuse the data for their own specific use or purpose.

Data can be repurposed then and used later for any purpose such as omniverse, metaverse, VR, MR, AR, and gaming environments for example.

The smart, self-healing blockchain-based data exchange device 203 is developing the first-of-its-kind autonomous delivery mobile and node-centric open platform network system. The smart self-healing node-centric blockchain mesh network-based data exchange system 100 has combined its smart node-centric blockchain mesh network IP application with its Smart Drone Rooftop and Ground Airport/Vertiport IP, Smart Mailbox Landing Pad IP, Smart Delivery Doorbell and Chime Miner, Smart Drone Landing Pad Miner, and or any other contributing data miner devices and sensors and its Smart Delivery Drone Mobile Application as a one-source solution for drone, vehicle, and robot on-demand hailing via inhouse and participating third-party fleet supply chains through an interoperable, scalable and modular, delivery open platform system that allows for data to be blockchain validated as trusted data with integrity and used for situational awareness and collision detection and avoidance, to provide an autonomous BVLOS delivery hailing service, using AIML for its near real-time, real-time and faster than real-time decision making in its specific operational use. After operational use of data, it can be reclassified as trustworthy "repurposed data."

Existing delivery transportation supply chain infrastructures bog down when introduced with more manually driven vehicles and trucks to sustain and maintain scalability. Roads and highways slow this delivery process down through traffic bottlenecking, stop signs, accidents, detours, weather, and available labor power. Multimodal milestone integration is key to the evolution of autonomy when it comes to transportation delivery. Being able to identify available modal transportation on the delivery of people and cargo Smart Delivery Drone App., allows for the user to choose between modal deliveries that are available based on any type of variable such as payload, energy, geo-location, weather, maintenance, to name a few. The smart node-centric mesh operating system will use software that permits the hailing of manual and autonomous vehicles currently existing in transportation while transitioning the drones, eVTOL/VTOLS, UGVs, UMVs, and robots throughout the regulatory approval processes.

The smart self-healing node-centric blockchain mesh network-based data exchange system 100 uses the data exchange server 102 as a search query processor that allows users to search for validated data 420 that is located within a s smart, self-healing blockchain-based data exchange device 203 of all of the universal computing nodes 105*i* shown in FIG. 4. The smart, self-healing blockchain-based data exchange device 203 comprises a blockchain processor 404 and blockchain ledger 115*i*. The validated data 420 is created by the sensors 406 that is processed by the blockchain processor 404 for inclusion within the blockchain ledger 115*i*. The sensor data 416 is considered validated if it is obtained by a universal node that has been onboarded into the data exchange system 100 as disclosed herein. The sensor data 416 is considered trusted as it is from a known hardware node and geneses data source and validated by consensus and clusters of nodes on the HGTP and DAG protocol and layer zero (L_0) network, these sensors 406, and is immediately processed within the blockchain processor 404 for inclusion in the blockchain ledger 115*i*. When a blockchain record of sensor data 500, as defined in reference to FIG. 5 below, is successfully added to the blockchain ledger 115*i* after it has been processed and agreed upon by a defined number of blockchain processors in separate universal computing nodes 105*a-b*, the data record is considered to be validated data 420. When a search for this data record is performed, the validated data 420 is known to be from its trusted source obtained on a date and at a time specified within the record 500 when retrieved from the blockchain ledger 115*i*. The data exchange search server 102 retrieves the record 500 and its validated data 420 from the ledger 115*i* upon request of a user submitting a search query. Operation of the data exchange search server 102 is described in detail below in reference to FIG. 7.

Figure 5:
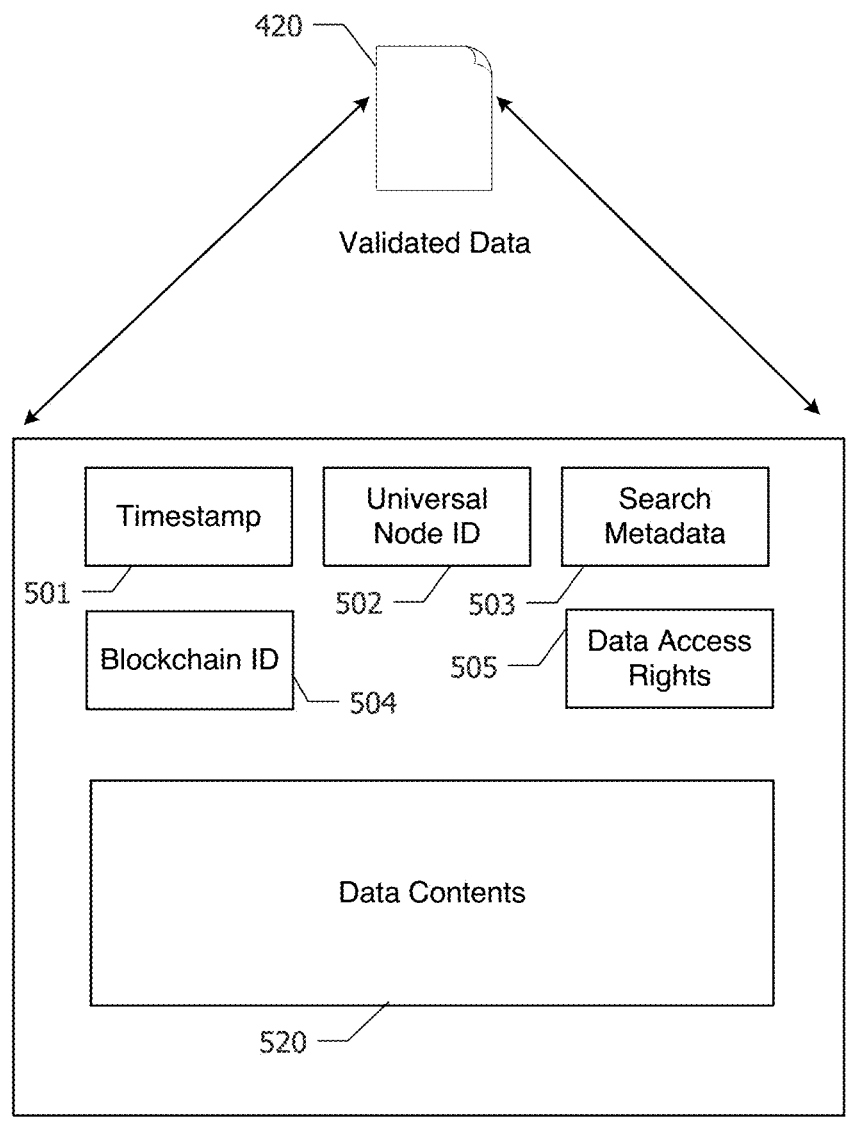
FIG. 5 illustrates a data exchange validated data record that may be used as part of a system for providing a smart, blockchain-based data exchange data storage device within a self-healing node-centric blockchain mesh network according to the present invention.

FIG. 5 illustrates a data exchange validated data record that may be used as part of a system for providing a smart, blockchain-based data exchange data storage device within a self-healing node-centric blockchain mesh network according to the present invention. Validated data 420 is stored within the blockchain record 500 that comprises at least the following data fields: a timestamp field 501, a universal node ID field 502, a sensor metadata field 503, a blockchain address ID 504, a data access rights field 505, and a data contents field 520.

The timestamp field 501 contains time and date data corresponding to the date and time when data from the sensors 406 was captured. Using the example embodiment of a universal computing node 101*i* that collects weather data, the timestamp field 501 captures when the weather data was recorded. The timestamp data may be used to determine whether the weather data contained within the blockchain record 500 is too stale to be considered current weather condition measurements for use with UAVs currently airborne about this particular universal computing node 101*i*. This timestamp data also may be used when past conditions at a specified time are needed and is retrieved from the blockchain ledger 115*i*. Stale data can be repurposed and resold under different NFR terms and conditions within the AMX data sub-exchanges.

The universal node ID field 502 contains a unique identifier that corresponds to the universal computing node 101*i* that generated the data contained within the blockchain record 500. This unique identifier will identify the source operating the universal computing node 101*i* as well as its location.

The sensor metadata field 503 defines the contents of the blockchain record 500 in terms to be used when a search is performed for requested data. The universal computing node 101*i* is configured to specify relevant terms that will permit the record to be found when needed. For the embodiment that collects weather data, the month, day, and year of the data's collection, the location of the sensors when the data was collected, and the types of data contained therein typically is used for the contents of the sensor metadata field 503. This metadata may be configured when the universal computing node 101*i* is initialized. The metadata also may be updated periodically when other useful terms may be associated with the sensor data when it is being collected. For example, weather data collected as a named storm is passing by the universal computing node 101*i* may be a useful metadata value that would allow users to search for all data associated with "Hurricane Amy" for data collected when this particular named hurricane was in the vicinity. This particular metadata term may then be removed from insertion into new blockchain records 500 once the hurricane has moved on.

The blockchain address ID 504 contains a unique address corresponding to the location of the blockchain record 500 within the blockchain ledger 115*i*. All blockchain ledgers identify their location within the ledger permitting specific data records to be retrieved from any universal computing node maintaining a copy of this particular ledger.

The data access rights field 505 contains a default set of digital data rights that may be obtained for the data within a particular blockchain record 500. As disclosed in detail in reference to FIG. 7 below, data within the data exchange may be acquired by a user in one or more of a defined set of types of digital rights available for purchase. The owner of the collected data may specify how the data may be acquired and the possible types of rights identified in the data access rights field 505. For example, data within a data record of 500 may be acquired for use for a limited period of time or may be acquired with a specific set of permissible uses. These access rights are set by the data owner. The type of access rights may change over time as the nature of the data changes. For weather data, permissible uses of data that are considered current may be different from permissible uses once the weather data is considered historical. The price associated with each permissible use and type of access rights granted may depend upon the nature of the data at the time when the data is used as well as when it was acquired.

The data contents field 520 contains the data from the sensors 406. The particular sensors used, their serial numbers, and other relevant information associated with the data are contained in the data contents field. Of course, the contents of the data may vary depending upon the sensors, the associated data scales of the data, any language of users of the data, and many other values that may be contained in this data field. Alternatively, additional fields also may be included within the blockchain data record 500. For example, an additional field that states whether temperature data is measured in Fahrenheit or Celsius data. Similarly, wind speeds may be measured in miles per hour or meters per second depending upon the sensor and the data usage.

Figure 6:
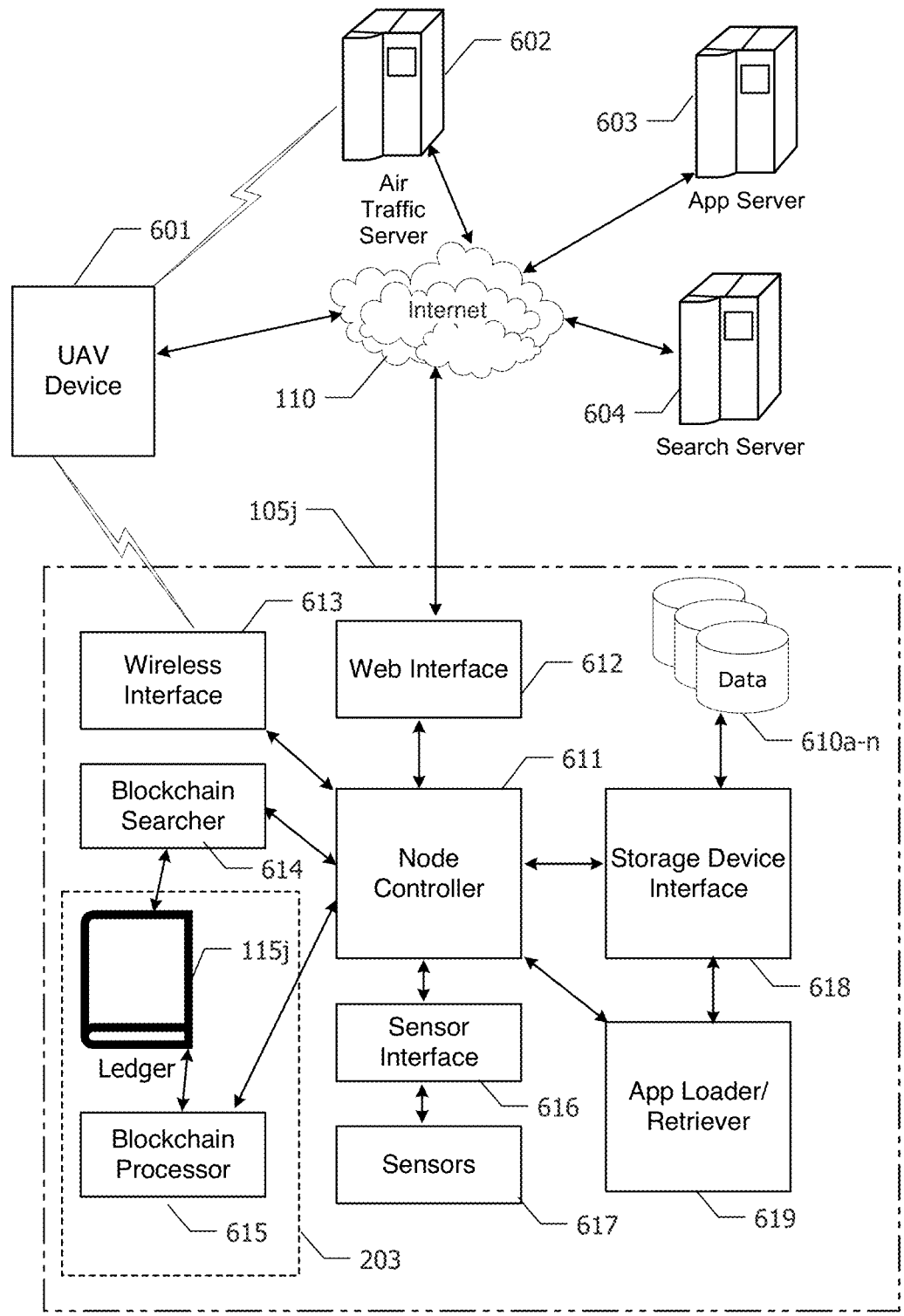
FIG. 6 illustrates a set of universal node software components that may be used as part of a system for providing smart, blockchain-based data exchange data storage devices within a self-healing node-centric blockchain mesh network according to the present invention.

FIG. 6 illustrates a set of software components 600 used within a universal computing node within a distributed computing device within a network of UAVs 125, smart rooftop UAV airports and landing pads, and remote UAV landing pads such as the Smart Rooftop Airport and Landing Pad and the Smart Mailbox Landing Pad disclosed in the commonly owned US Patent Applications cited above.

The set of software components 600 comprises a node controller 611, a web interface 612, a wireless interface 613, a blockchain searcher 614, a blockchain processor 615, a storage interface 618, an app loader/retriever 619, and a sensor interface 616 coupled to a set of sensors 617. As noted above, the combination of a blockchain processor 615 and blockchain ledger 115*i* creates a smart, self-healing blockchain-based data exchange device 203.

The node controller 611 acts as a central controller for the set of software components 612-619. Commands from the applications are received and processed to determine actions to be taken, and then mobile app commands are passed to the other software components 612-619, as needed, to implement the actions to be taken. The node controller 611 also may receive and process data received from the web interface 612, the wireless interface 613, and the local hardware and local input devices for use in the applications running on the computing node 101*i*.

The web interface 612 permits the computing nodes 101*i* to communicate with remote computing devices such as application servers 603, air traffic servers 602, and mobile UAV devices 601. The web interface 612 performs all of the data formatting, computer-to-computer communications, encryption processing, and all similar operations needed by the computing node 101*i* to communicate with these remote systems and devices.

The wireless interface 613 also permits the computing nodes 101*i* to communicate with remote computing devices such as application servers 603, air traffic servers 602, and mobile UAVs 125 over a wireless communications channel that can be frequency agnostic as a full spectrum frequency hopping and smart antenna solution. The wireless interface 613 is especially useful to permit a computing node 101*i* to communicate with a computing node within a UAV 125 while in flight. The wireless interface 613 performs all of the data formatting, computer-to-computer communications, encryption processing, and all similar operations needed by the computing node 101*i* to communicate with these remote systems and devices.

The blockchain searcher 614 receives a search query from a user via the data change search server 101 as described below in reference to FIG. 7 The blockchain searcher 614 uses the search query to identify blockchain records 500 in which the terms within the search query match the metadata terms within the blockchain data record 500. In some embodiments, the blockchain searcher 614 may maintain a search index (not shown) containing pointers to the blockchain data records 500 having particular metadata values. This search index may be updated when a new blockchain data record 500 is added to the blockchain ledger 115*i*. Other searching techniques and related database structures may be included in the blockchain searcher 614 to perform fast and efficient searches for matching blockchain data records 500.

The blockchain processor 614 performs blockchain operations to maintain data within the blockchain ledger 115*i* used to provide security and data integrity for the data changes as disclosed herein.

The storage interface 618 provides input and output processing to provide a node controller 611 and all other software components 612-619 with data needed to perform the functions implemented in the application running in the computing node 101i. This storage interface 618 maintains all data stored on the local storage devices 610a-n as well as stores, retrieves, and deletes the data stored within the local storage device 610a-n as needed.

The app loader/retriever 619 receives commands from the node controller 611 to locate and download one or more mobile applications from the application server 603 for use within the computing node 101i. The app loader/retriever 619 sends requests to the application server 603, downloads applications from the application server 603, stores the applications into the local storage devices 610a-n for later use, and retrieves the applications from the local storage devices 610a-n for execution within the computing node 101i when needed. The app loader/retriever 619 also may periodically check for updates to previously downloaded applications and download updates from the application user 603 to permit the computing node 101i to maintain a current version of the applications.

The sensor interface 616 provides input and output processing to receive input data from the local sensors 617 to provide a node controller 611 and all other software components 611-618 with data needed to perform the functions implemented in the application running in the computing node 101i.

Figure 7:
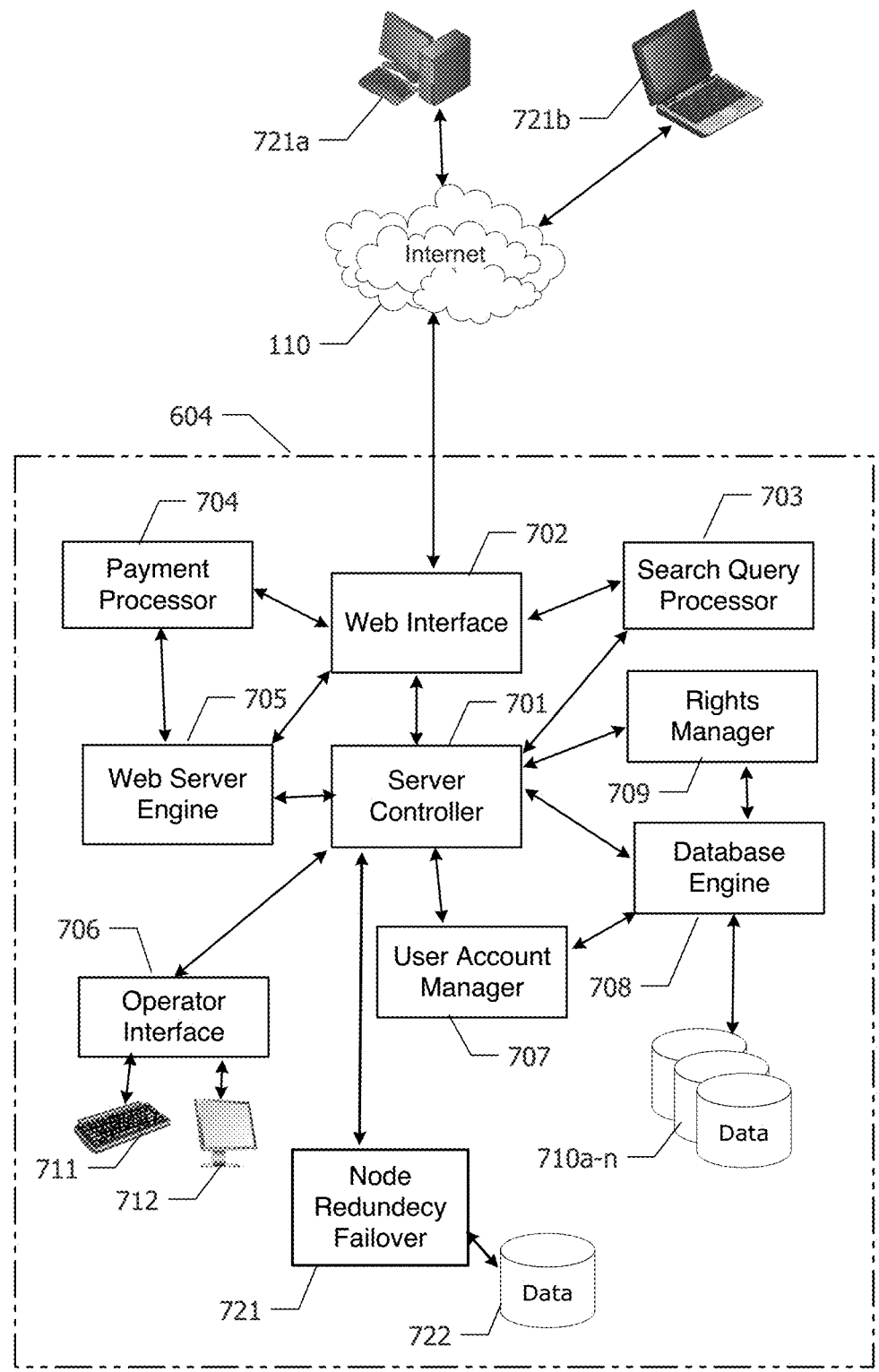
FIG. 7 illustrates a data exchange data record search server that may be used as part of a system for providing a smart, blockchain-based data exchange data storage device within a self-healing node-centric blockchain mesh network according to the present invention.

FIG. 7 illustrates a data exchange data record search server that may be used as part of a system for providing a smart, blockchain-based data exchange data storage device within a self-healing node-centric blockchain mesh network according to the present invention. The set of a set of software components 700 used in a data exchange data search server 102 as part of a system for providing a smart, blockchain-based data exchange data storage device within a self-healing node-centric blockchain mesh network according to the present invention.

The data exchange data record search server 102 may provide Decentralized Financing (DeFi) through cryptocurrencies and participating currencies, the launch pad, and staking programs. Using the Data Rating Service and or Data-Backed Securities service, one can monetize and or subsidize the VIB payment terms supported with the Asset-Backed Security of the device node miners and the validated data it generates and supports on the Exchange(s). One can participate by locking up (staking) a cryptocurrency for a period and receive rewards, incentives, and/or staking of a cryptocurrency itself. Launchpads can be used for blockchain projects and funding can be launched through the same method. The data exchange data record search server incorporates all these features to reward stakers and users using social interactions of data suppliers, users, and the data itself, allowing for "node gamification" rewards opportunities for end-users using the mobile applications, but will also allow the stakers to have their own incentives and opportunities for participation. Reward points, NFTs, NFRs, and cross-currencies are maintained and stored in the digital wallet.

Additionally, participating cities and municipalities can now invest in sensor data infrastructure that they themselves can subsidize and or monetize through the system's industry-specific exchange(s). Once turned on, the data exchange data record search server can identify them as a node data supplier; the sensors are not limited to the repurposed roofs and ground areas in the private sector. Existing institutional buildings such as police stations, airports, hospitals, roads, highways, bridges, railways, bus stations, train stations, and other transportation multimodal rooftop solutions can provide data-driven sensors and that can become discoverable for other government agencies' use through cross-platform demand. Any data that is not deemed confidential and or classified can be repurposed for sale, lease, license, and/or free to the public and private sectors but are not limited to any terms and conditions agreed to under the digital data bundle of rights (DDBR) solutions that create the NFR. Infrastructure inspections for powerlines, highways, bridges, and towers can now be more cost-effective and less risky when carrying out the public services to maintain and monitor them. Police dispatch and first responder features will allow for time-sensitive and lifesaving critical data that could have been lost without the quick access and execution of trusted data.

Discoverable data that can be market maker driven for end-users such as drone operators, industry analysts, universities, aviators, meteorologists, scientists, vendors, suppliers, mobile app hailing users for the delivery of people and or cargo for crypto/token rewards, public and private sector data acquisition companies, construction, real estate companies, municipalities, legal entities, law enforcement, military and even just someone who simply would like to know the daily weather on their smartphone, to name a few, have been trapped in centralized government, institution, and industry-specific sectors that are either unknown or not discoverable to other market sectors as being trusted reliable integrity data that is available for purchase, lease, license, use, and/or reuse. Most used data is purged, dumped, deleted, and/or stored for historic memorialization because it either has no specific use other than what it was intended for from its inception, it is too costly to store if it has no further purpose, there is no place they know where to market the data, the data has a specific shelf life, the information is confidential or classified and the owner doesn't know when it will be declassified or if they can repurpose the specific data they are able and willing to sell, and/or the data is not verifiable and therefore not reliable as data with integrity that can be tracked to its source, giving little to no value to the end-user who might want to purchase the data or to the data supplier who put the sweat into originating the data who deserves to be paid for their labor.

The data exchange data record search server may operate as a Blockchain Validated Data as a Service (BVDasaS), Blockchain Validated Data Storage as a Service (BVDSasaS), Data Market Maker as a Service (DMMaaS), and Data Aggregation and Railing as a Service (DARS).

The BVDasaS permits users to mine, validate and monetize raw, modeled, and co-op modeled data. The data exchange data record search server introduces the concept of "repurposing of data" on decentralized subject-specific discoverable data exchange(s) that will allow for data suppliers and data users to have a go-to data market where they can query and purchase and/or lease specific data on a discoverable data exchange that they can rely on as validated. Chain of custody of the data via blockchain allows data suppliers and stakeholders to be compensated for the data they have put through the BVDaaS interoperable open platform data exchange model.

The BVDSasaS addresses the need to store validated data by the depository and/or repository methods. BVDSasaS will provide data storage after the blockchain validation process for data to be discoverable as trusted data on data exchanges.

DMMaaS creates a market as the market maker for data suppliers and data users via industry-specific data exchange (s). Data suppliers will be able to place blockchain-validated data on the data exchange or exchanges. Here is where data users will be able to purchase, lease, license, use, reuse and/or receive for free this discoverable data under any terms or conditions that they dynamically interact and or select. By simply providing a query request of a keyword or words that the data supplier set up in its back-office dashboard account, the end-user can discover trusted data that has been validated through the network's node consensus system on the L-0 HGTP, DAG, Web3, state channel, consensus network layer.

The present invention may be used to create an autonomous delivery infrastructure system of systems by repurposing existing infrastructure and data through the steps of mining, cyber-secure data validating, and providing monetization solutions, so that it has positioned itself through its ViB solution to be the relied upon open platform system as the autonomous interoperable integrator of hardware and software, the aggregator of participating sensor data suppliers, with discoverable integrity data to the participating end users, as a market maker of trusted, monetized and rewarded data via fiat, crypto, tokens, NFTs, and NFRs, to name a few.

In order to perform all of the above functions, the data exchange data record search server 102 software components 700 comprise a server controller 701, a server web interface 702, a search query processor 703, a payment processor 604, a web search engine 705, an operator interface 706 coupled to user input/output devices 711-712, a user account manager 707, a database engine 708, and an access rights manager 709.

The server controller 701 acts as a central controller for the set of software components 702-709. Operator commands from the operator input devices 711-712 via the operator interface 706 are received and processed to determine actions to be taken, and then server commands are passed to the other software components 702-709, as needed, to implement the actions to be taken. The node controller 701 also may receive and process data received from the web interface 702, associated with search queries from user search computers 721*a-b*. The search queries are passed to the search query processor 703 for transmittal to a universal computing node 101*i* to perform a search against a blockchain ledger 115*i*.

The server web interface 702 permits the data exchange search server 604 to communicate with remote computing devices such as universal computing nodes 101*a-n*, application servers 603 and air traffic servers 602, and mobile UAVs 125. The web interface 702 performs all of the data formatting, computer-to-computer communications, encryption processing, and all similar operations needed by the computing node 101 to communicate with these remote systems.

The search query processor 703 generates the search results for available blockchain data records 500 within the blockchain ledger 115*i* based upon a query or browse request from the users' computers 721*a-b*. The query or browse request includes search terms, blockchain ledger address IDs and universal computing node IDs, timestamp ranges, metadata terms to be matched, and possible location data associated with the universal computing nodes that are used by the search query processor 703. The generated search results are returned to the users' computers 721*a-b* via the server web interface 702

The payment processor 704 receives user payment information from the user account manager 707 in order to submit a request for payment from a remote bank account transaction server (not shown). The user payment information may comprise digital wallets for cryptocurrency, and or credit and debit card information needed to initiate a payment for access rights to blockchain data records 500. The user payment information also may be electronic check routing and account numbers needed to initiate a payment for access rights to blockchain data records 500. The payment processor 604 receives a request for payment from the access rights processor 709 once a user has submitted a request to acquire access to digital data. Once payment has been received, the payment processor 604 returns a notification to the access rights processor 709 that it can release the access rights to the user.

The web search engine 705 provides users' computers 721*a-b* a search user interface to locate and retrieve search results and corresponding blockchain data records 500. The web search engine 705 presents search options to the users' computers in a graphical user interface (GUI) allowing users to log into the data exchange search server 604, to submit search queries that are processed by the search query processor 703, and to acquire access rights and download blockchain data records 500. The present invention uses the payment processor 704 and the rights access processor 709 to satisfy requests to acquire access rights and download blockchain data records 500.

The operator interface 706 coupled to user input/output devices 711-712 provides input and output processing to provide a server operator with messages and data needed to perform, configure, operate, maintain, and backup the data exchange search server 604. This interface module 706 also accepts commands from the user input/output devices 711-712 to instruct the server to perform these tasks.

The user account manager 707 permits users to connect to and access the data exchange search server 604. The user account manager 707 is responsible for creating and managing user accounts for the users 721*a-b*, and universal computing node administrators (not shown). The user account manager 707 also is used in authenticating a user based upon user input. Typically, the user input uses a username and password. Multi-factor authentication, use of one-time passwords, and similar secure authentication mechanisms may be included in the user profile. For every sign in the system will recognize the user type, i.e. the users 721*a-b*, and universal computing node administrators, along with all past activities from account details in the database. Based on user type, the data exchange search server 604 behavior will change.

The database engine 708 processes all database operations for the databases and local storage devices 710*a-n*. The database engine 708 searches for server data records (not shown) within the databases and local storage devices 710*a-n*. The server data records may comprise user account records, user data purchase payment records, access rights data records, and search query logs. These operations include insertion of server data records into the databases and local storage devices 710*a-n*, deletion of server data records from the databases and local storage devices 710*a-n*, searching and retrieving server data records from the databases and local storage devices 710*a-n*, and indexing the databases and local storage devices 710*a-n* to maintain efficient searching when needed.

The access rights manager 709 accepts user requests to obtain a Digital Data Bundle of Rights agreed to under a non-fungible right (NFR), for one or more blockchain data records. As noted above, the user may acquire dynamic and or static data access rights, data type access rights, file access rights, data format access rights, video access rights including view and rebroadcasting rights, audio access rights including view and rebroadcasting rights, communication frequencies, spectrums, and any other monetizable set of rights and obligations. The access rights manager 709 determines the type of access rights that are available for each blockchain data record 500 in which access rights are to be granted. The access rights manager 709 determines the price for the particular access rights requested and provides the price to the user. If the user accepts a price and provides payment information, the access rights manager 709 sends a request for payment to the payment processor 704. Once the payment processor 704 indicates that payment has been received, the access rights manager 709 grants access to the particular blockchain data records 500. This access grant may also be documented in the data exchange search database and local data storage devices 710*a*-*n* in order to provide access to these data records at a later date. If the access rights manager 709 determines that a request data record has already been granted access rights, the access rights manager 709 may immediately grant a user access to the data.

The embodiments described herein with respect to all of the components of the one or more universal computing nodes within a self-healing node-centric blockchain mesh network may be implemented as logical operations performed by a computer. The logical operations of these various embodiments of the present invention are implemented (1) as a sequence of computer-implemented steps or program modules running on a computing system and/or (2) as interconnected machine modules or hardware logic within the computing system. Accordingly, the logical operations making up the embodiments of the invention described herein can be variously referred to as operations, steps, or modules. As such, persons of ordinary skill in the art may utilize any number of suitable electronic devices and similar structures capable of executing a sequence of logical operations according to the described embodiments. For example, the one or more universal computing nodes within a self-healing node-centric blockchain mesh network 100 may be virtualized for access by multiple users and/or applications. This characterization of the processing components also applies to the processing components within the data exchange and the universal computing nodes within the smart self-healing node-centric blockchain mesh network as disclosed in the related US patent applications referenced above.

Additionally, the logical operations making up the embodiments of the present technology described herein can be variously referred to as operations, steps, or modules. In order to provide functionality according to some other embodiments, such steps, processes, or methods may be performed in different orders than those described and illustrated in the drawings, and one or more steps, processes, or methods may be omitted. The modules may be implemented as software executing on a general-purpose computing device, firmware executing with an embedded processing device within a component of a computing system, and a state machine-based electronic sequencer that generates a sequence of electrical signals with an electronic device or devices that cause the sequence of operations described herein being equivalent. The implementation is a matter of choice dependent on the performance requirements of the computing system implementing the invention.

If implemented in APIs, SDKs, firmware, and/or software, the functions described above may be stored as one or more instructions or codes on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc include compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

Even though particular combinations of features are recited in the present application, these combinations are not intended to limit the disclosure of the invention. In fact, many of these features may be combined in ways not specifically recited in this application. In other words, any of the features mentioned in this application may be included in this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

I claim:

1. A system for providing a smart, self-healing blockchain-based data exchange data storage device within a self-healing node centric blockchain mesh network, a smart self-healing data exchange device being within one or more universal computing nodes within a self-healing node centric blockchain mesh network, the smart self-healing blockchain data exchange device comprises:
    a blockchain processor for storing and maintaining a set of blockchain data records stored within a blockchain ledger, each blockchain data record within the set of blockchain data records having a blockchain ID, a universal computing node ID uniquely identifying a node within the self-healing node-centric blockchain mesh network, a bundle of digital access rights cryptographically enforced via smart contracts stored on the blockchain ledger, and content data; and
    an instantiation of the blockchain ledger communicatively coupled to the blockchain processor is stored within a plurality of the one or more universal computing nodes within a self-healing node-centric blockchain mesh network, wherein the self-healing node-centric blockchain mesh network automatically redistributes ledger data to active nodes using a decentralized peer-to-peer consensus protocol.

2. The smart self-healing data exchange device according to claim 1, wherein the bundle of digital access rights provides for rights and privileges associated with blockchain data records that can be divided by use, terms, and ownership.

3. The smart self-healing data exchange device according to claim 2, wherein the bundle of digital access rights comprises an ownership title to contents of a blockchain data record, a right to resell the contents of a blockchain data record, a right to copy the contents of a blockchain data record, a right to access the contents of a blockchain data record being limited in time, a right to access the contents of a blockchain data record being limited in use, and a right to access to contents of a blockchain data record being limited in data format.

4. The smart self-healing data exchange device according to claim 3, wherein the bundle of digital access rights further restricts the access and use to the contents of a blockchain data record using any other characteristic associated with the contents of the blockchain data record.

5. The smart self-healing data exchange device according to claim 1, wherein the blockchain processor and a blockchain ledger utilize communications and secure storage technologies including L_0 (level zero) distributed network implementing a HGTP (hypergraph transfer protocol) for interoperability across heterogeneous blockchain networks, HGTP for peer-to-peer data transfer within the mesh network, and any TCP-IP network configuration and protocol.

* * * * *